United States Patent

[11] 3,622,999

[72] Inventors Frank C. Getz, Jr.
Upper Providence, Pa.;
James A. Fraunfelder, Franklin, Mass.;
Sidney L. Kauffman, Jr., Durham, N.C.;
William H. Kurlans, Philadelphia, Pa.
[21] Appl. No. 837,653
[22] Filed June 30, 1969
[45] Patented Nov. 23, 1971
[73] Assignee Gulf & Western Systems Company
New York, N.Y.
Continuation-in-part of application Ser. No. 654,649, July 19, 1967, now abandoned. This application June 30, 1969, Ser. No. 837,653

[54] BINARY-CODED EMERGENCY COMMUNICATION SYSTEM
9 Claims, 12 Drawing Figs.

[52] U.S. Cl. .......... 340/171 R, 325/55
[51] Int. Cl. .......... H04q 1/00
[50] Field of Search .......... 340/171, 164; 325/55, 51; 235/92 BD

[56] References Cited
UNITED STATES PATENTS

| | | | |
|---|---|---|---|
| 2,827,626 | 3/1958 | DeMotte | 235/92 UX |
| 3,173,128 | 3/1965 | Tatsuzawa | 340/164 |
| 3,225,348 | 12/1965 | Gilman | 340/171 X |
| 3,268,862 | 8/1966 | Pettitt | 325/55 UX |
| 3,304,414 | 2/1967 | Ham et al. | 235/92 |
| 3,441,858 | 4/1969 | Graham | 325/55 |

*Primary Examiner*—John W. Caldwell
*Assistant Examiner*—Michael Slobasky
*Attorney*—Meyer, Tilberry and Body

ABSTRACT: There is provided a binary-coded signal communication system including a plurality of transmitters for transmitting binary-coded frequency signals and a receiver for receiving said binary signals, wherein each of the transmitters includes a means for generating at least one address word and a message word, wherein each word is comprised of a series of binary-coded frequency pulses selected from a first frequency and a second frequency; and, the receiver includes means for separating the reference frequency from the series of binary-coded first and second frequencies, and a binary-coded decimal-to-decimal decoder means for decoding the series of binary-coded first and second frequencies and providing decimal indications thereof.

*INVENTORS.*
JAMES A. FRAUNFELDER,
FRANK C. GETZ, JR.
SIDNEY L. KAUFFMAN, JR.
& WILLIAM H. KURLANS
BY *Meyer, Tilberry & Body*
ATTORNEYS INVENTORS.
JAMES A. FRAUNFELDER,
FRANK C. GETZ, JR.,
SIDNEY L. KAUFFMAN, JR. &
WILLIAM H. KURLANS
BY *Meyer, Tilberry & Body*
ATTORNEYS INVENTORS.
JAMES A. FRAUNFELDER,
FRANK C. GETZ, JR.,
SIDNEY L. KAUFFMAN, JR.
& WILLIAM H. KURLANS
BY Meyer, Tilberry & Body
ATTORNEYS INVENTORS.
JAMES A. FRAUNFELDER,
FRANK C. GETZ, JR.,
SIDNEY L. KAUFFMAN, JR. &
WILLIAM H. KURLANS
BY *Meyer, Tilberry & Body*
ATTORNEYS INVENTORS.
JAMES A. FRAUNFELDER,
FRANK C. GETZ, JR.
SIDNEY L. KAUFFMAN, JR.
& WILLIAM H. KURLANS
BY *Meyer, Tilberry & Body*
ATTORNEYS INVENTORS.
JAMES A. FRAUNFELDER,
FRANK C. GETZ, JR.,
SIDNEY L. KAUFFMAN, JR. &
WILLIAM H. KURLANS
BY *Meyer, Tilberry & Body*
ATTORNEYS INVENTORS.
JAMES A. FRAUNFELDER,
FRANK C. GETZ, JR.,
SIDNEY L. KAUFFMAN, JR. &
WILLIAM H. KURLANS
BY *Meyer, Tilberry & Body*
ATTORNEYS INVENTORS.
JAMES A. FRAUNFELDER,
FRANK C. GETZ, JR.,
SIDNEY L. KAUFFMAN, JR. &
WILLIAM H. KURLANS
BY Meyer, Tilberry & Body
ATTORNEYS INVENTORS.
JAMES A. FRAUNFELDER,
FRANK C. GETZ, JR.,
SIDNEY L. KAUFFMAN, JR. &
WILLIAM H. KURLANS
BY *Meyer, Tilberry & Body*
ATTORNEYS INVENTORS.
JAMES A. FRAUNFELDER,
FRANK C. GETZ, JR.,
SIDNEY L. KAUFFMAN, JR. &
WILLIAM H. KURLANS
BY *Meyer, Tilberry & Body*
ATTORNEYS

BINARY-CODED EMERGENCY COMMUNICATION SYSTEM

The present invention is a continuation-in-part of our U.S. Pat. Application, Ser. No. 654,649, now abandoned, entitled "Coded Signal Communication System", filed July 19, 1967, and assigned to the same assignee as the present invention.

This invention pertains to the art of radio communications and, more particularly, to communication systems for transmitting and receiving binary-coded frequency signals.

The invention is particularly applicable to an emergency communication system for reporting highway emergencies, such as a disabled automobile, or an automobile accident, and will be described with particular reference thereto, although it will be appreciated that the invention has broader applications such as transmission of address and message information by employing binary-coded frequency signals.

At present, there is a need for a highway emergency radio system so that a vehicle operator, in need of assistance, may signal a control station and provide the control station with information as to the address of the operator as well as of the type of assistance required, such as a tow truck, police, ambulance, et cetera. In such a system, a plurality of transmitters may be located at selected points along the sides of the highway. In the present invention it is proposed that if a vehicle operator requires assistance, such as a tow truck, police, ambulance, et cetera, he merely actuates one of a number of pushbuttons, or the like, respectively, representative of these various functions. A binary-coded information signal is then transmitted to the central station where the information is decoded and presented on a suitable readout. This readout should provide the operator at the central station with information as to the address of the calling transmitter, together with the function desired, i.e., whether the caller requires an ambulance, police, et cetera.

Radio emergency systems known heretofore have included a plurality of transmitters, each capable of transmitting radiofrequency signals modulated by a selected one of a plurality of frequencies indicative of the nature of the emergency condition. Also, receiving equipment as provided for receiving the warning signals and included a demodulator, a plurality of frequency-responsive load circuits connected to the demodulator and responsive to a different one of the separate frequencies, and visual indication means connected to the load circuit for providing a visual indication of the emergency condition.

One of the principal problems of the heretofore known emergency communication systems was that there was no means to correct an error in the received signal. Another problem of communication systems of this type was that frequently the receiver was actuated by spikes or noise pulses, and an erroneous visual indication of an emergency condition resulted therefrom. In addition, frequency drifts which are inherent in such communication systems frequently cause a false actuation of the receiver, thereby also causing an erroneous visual indication of the emergency condition.

The present invention is directed toward transmitters and receivers particularly applicable for use in a highway emergency radio system, although the invention is not limited thereto, and which employs a binary code signal which permits increased transmission accuracy over the modulated carrier systems known heretofore.

In accordance with the present invention, there is provided a binary-coded signal communication system including a plurality of transmitters for transmitting binary-coded frequency signals and a receiver for receiving the binary signals wherein; each of the transmitters includes circuit means for generating a reference frequency and circuit means for generating at least one address word and a message word, wherein each word is comprised of a series of binary-coded frequency pulses selected from a first frequency and a second frequency; and, the receiver means for separating the reference frequency from the series of binary-coded first and second frequencies, and binary-coded decimal-to-decimal decoder means for decoding the series of binary-coded first and second frequencies and providing decimal indications thereof.

In accordance with a more limited aspect of the present invention, each transmitter includes oscillator means for generating a reference frequency signal; and, frequency shift control means for selectively shifting the frequency of the oscillator frequency from the reference frequency to either of the first frequency or the second frequency.

In accordance with another aspect of the present invention there is provided a binary-coded receiver having circuit means for receiving a reference frequency signal and a series of binary-coded first and second frequency signals; circuit means for separating said series of binary-coded signals from said reference frequency signal; and decoder means for decoding the series of binary-coded signals and providing a decimal indication thereof.

In accordance with another aspect of the present invention, there is provided an apparatus for transmitting at least N-words wherein each word is comprised of a series of four consecutive frequency pulses selected from two different frequency levels and coded as a binary-coded decimal number with the total binary content of each word having a decimal weight in the range of from 0 to 15 and comprising: controllable oscillator means for providing a train of frequency pulses of a normal given frequency of $f_r$ and controllable to first and second frequency level conditions of frequencies $f_1$ and $f_2$ respectively representative of binary "1" and binary "0" signals; binary-counting means for counting trigger pulses and proving an output pattern of binary signals which pattern changes in dependence upon the number of trigger pulses counted; means for applying in trains of four consecutive trigger pulses each to the binary-counting means; and, N-binary signal logic means respectively associated with a different one of the N-trains of trigger pulses for consecutively receiving the binary signal output pattern resulting from the four trigger pulses of the associated train of trigger pulses and for each trigger pulse actuating the controllable oscillator means to either the first or second frequency level.

The primary object of the present invention is to provide an improved binary-coded signaling system for transmitting and receiving binary-coded frequency signals which incorporate both transmitting message and address information.

Another object of the present invention is to provide a binary radio call system incorporating frequency shift-keying means in the system transmitters.

Another object of the present invention is to provide a code-signaling system for transmitting frequency signals in accordance with a binary code so that a series of pulses represents message and address information.

Another object of the present invention is to provide a coded frequency communication system with means for correcting an erroneous transmitted or received signal.

A further object of the present invention is to provide a binary-coded communication system in which transmission of information is possible even with frequency variations in the transmitter carrier frequency.

A still further object of the present invention is to provide an improved receiver for receiving and decoding a series of binary frequency pulses.

A still further object of the present invention is to provide a receiver incorporating circuit means to prevent false actuations of the receiver by noise pulses.

The foregoing and other objects and advantages of the invention will become apparent from the following description used to illustrate the preferred embodiment of the invention, as read in connection with the accompanying drawings in which:

FIG. 1 is an illustration of an application of the invention incorporating a plurality of transmitters located along the sides of a highway, and a receiver;

FIGS. 2, 2A, and 2B taken together illustrate a combined schematic, block diagram of a transmitter constructed in accordance with the present invention;

GENERAL DESCRIPTION

Figure 1:
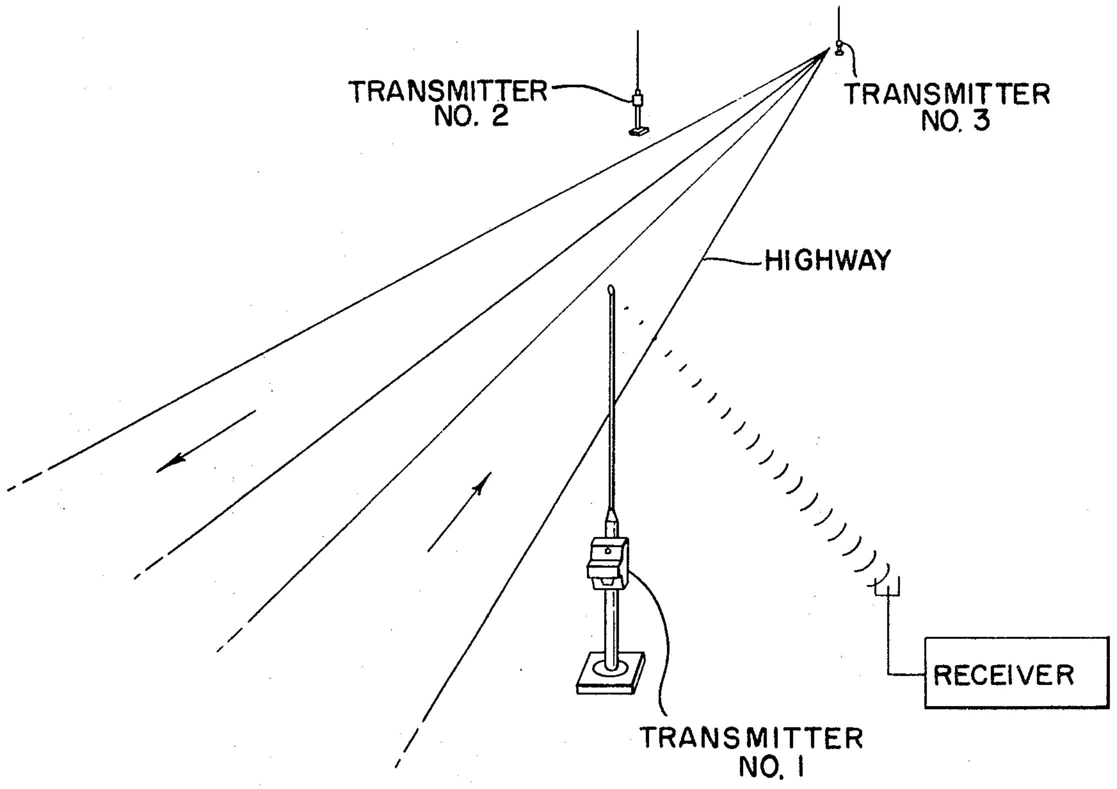
Figure 3:
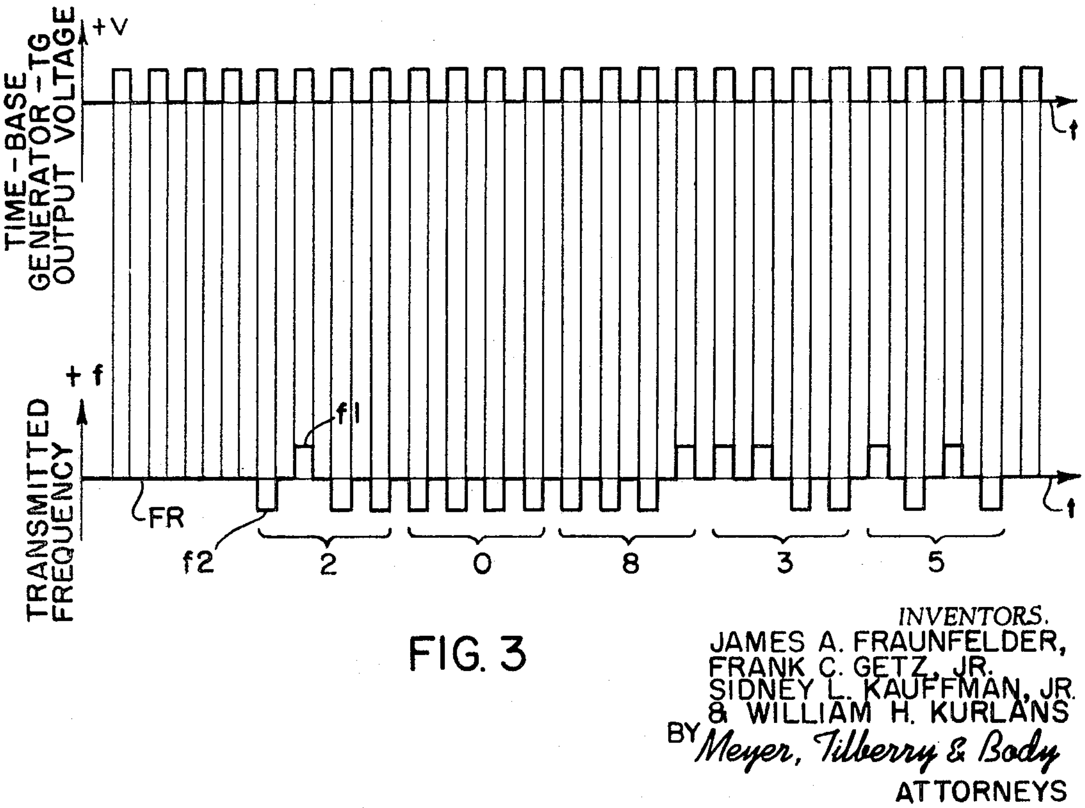
FIG. 3 is a graph showing waveforms illustrative of the operation of the transmitter.

Referring now to the drawings and, more particularly, to FIG. 1, there is illustrated an application of the present invention as a radio emergency communication system. This system includes a plurality of transmitters located along a highway and a receiver. The details of construction and the theory of operation of each transmitter will be described in greater detail hereinafter with reference to FIGS. 2 and 3, and details of construction and the theory of operation of the receiver will be described in greater detail hereinafter with reference to FIGS. 4 through 5E. The transmitters may be located at selected points along a highway, or the like, and the receiver may be located at a central station. If a vehicle operator requires assistance, such as a tow truck, police, ambulance, et cetera, he merely presses one of a number of buttons, or the like, on a nearby transmitter. These buttons are representative of a series of different functions or messages. A coded signal is then transmitted to the receiver at the central station where the information is decoder and presented on a suitable decimal readout. This decimal readout will provide the operator at the central station with information as to the address of the calling transmitter together with the function desired, i.e., whether the caller requires an ambulance, police, tow truck et cetera. As will be discussed in greater detail hereinafter, the coded signal transmitted includes a train of frequency pulses comprised of a reference frequency pulse, a frequency pulse greater than the reference frequency, and a frequency pulse less than the reference frequency. The train of pulses may be comprised of five series of pulses, or words, which are representative of the address and the function portion of the message to be sent by the caller.

TRANSMITTER

Figure 2:
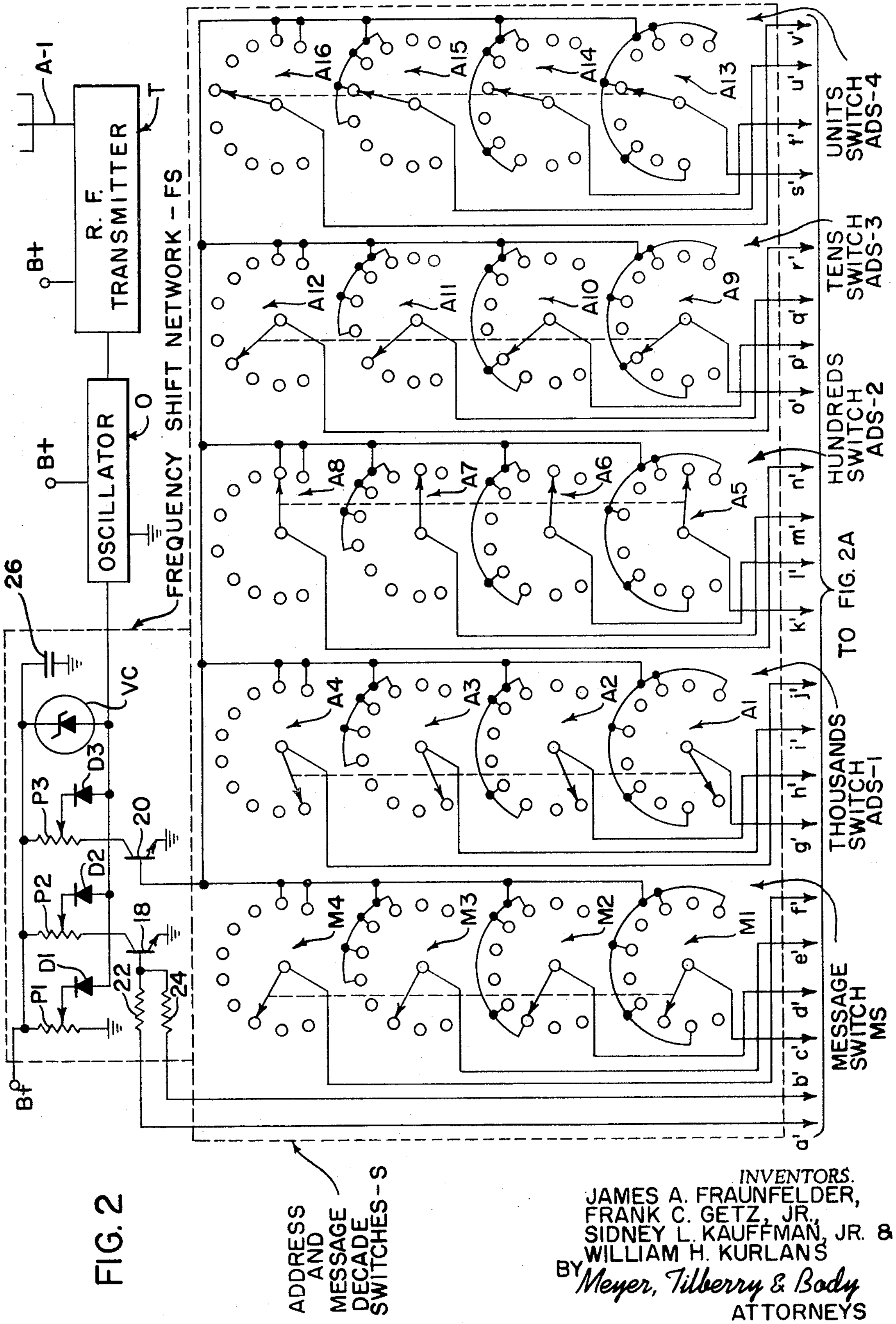

Referring now to FIG. 2, there is illustrated the preferred embodiment of each transmitter used in the communication system. Thus, the transmitter generally comprises: a transmitter initiator PB; a word generator PS; a time-base generator TG; a bit generator BG; a word generator WG; a round counter RC; a gating network G; address and message decade switches S; a frequency-shift network FS; and a crystal-controlled oscillator O, having its output coupled to a radiofrequency transmitter T. As illustrated, the message and address decade switches include a message switch MS, a thousands switch ADS–1, a hundreds switch ADS–2, a tens switch ADS–3, and a units switch ADS–4 which serve to select the message and address to be transmitted. Briefly, during the operation of the transmitter the bit generator BG and word generator WG serve to count pulses received from the time-base pulse generator TG, and, depending on the pulse count, a match will be obtained at the gating network G. Gating network G generally comprises a series of NOR gates, and depending on which NOR gates have a match, a selected control signal is applied to the frequency-shift network FS thereby causing the frequency of oscillator O to remain at a reference frequency, be shifted to a frequency higher than the reference frequency, or be shifted to a frequency lower than the reference frequency. The bit generator BG and word generator WG are coupled to a round counter RC which permits the train of transmitted pulses to be repeated three times, whenever the transmitter is actuated.

OSCILLATOR AND FREQUENCY SHIFT CIRCUITS

The oscillator O preferably takes the form of a crystal-controlled oscillator, and is coupled through a radiofrequency transmitter T to an antenna A–1 in a conventional manner. The input side, or the crystal, of oscillator circuit O is connected to one terminal of a variable capacitance device VC having the other terminal thereof connected to a B+ voltage supply source. Variable capacitance device VC may, for example, take the form of a Zener diode. As is well known, one characteristic of a Zener diode is that it serves as a voltage-controlled, variable capacitance device, wherein its capacitance varies inversely with the direct-current signal applied to its anode-cathode circuit. Since the cathode of the variable capacitance device VC is connected to the B+ voltage supply source, its capacitance may be altered by varying the value of the potential applied to its anode. Thus, for example, if the direct-current voltage applied to the anode of Zener diode VC is decreased in a negative direction, the voltage applied across the anode to cathode circuit of the diode is increased. Since the variable capacitance device VC serves as a capacitive load for the crystal of oscillator circuit O, a change in the potential applied to the anode of Zener diode VC will result in a change in the output frequency of oscillator O.

Frequency-shift network FS serves to selectively change the value of the potential applied to the anode of the Zener diode VC. Frequency-shift network FS also includes three potentiometers P1, P2 and P3, each having one of the stationary terminals thereof connected directly to the B+ supply source. The movable arm of potentiometers P1, P2 and P3, are respectively connected through diodes D1, D2, and D3, poled as shown in FIG. 2, to the anode of Zener diode VC. The other stationary terminal of potentiometer P1 is connected directly to ground, the other stationary terminal of potentiometer P2 is connected to the collector of an NPN-transistor 18, and the other stationary terminal of potentiometer P3 is connected to the collector of an NPN-transistor 20. The emitters of transistors 18 and 20 are connected directly to ground, the base of transistor 18 is connected through a pair of parallel-connected resistors 22, 24 to gating network G, and the base of transistor 20 is connected to the address and message decade switches S. Also, connected to the cathode of Zener diode VC is one terminal of capacitor 26 having the other terminal thereof connected directly to ground.

MESSAGE AND ADDRESS DECADE SWITCHES

Message switch MS, as well as the address decade switches ADS–1 through ADS–4, each include a rotary-type decade switch having four banks of contacts. As is illustrated in FIG. 2, selected contacts in each bank of contacts are connected to the base of transistor 20, and the wiper arms of message switch MS and address switches ADS–1 through ADS–4 provide a set of terminals $a'$ through $v'$ which connect with gating network G. The wiper arms of each bank of contacts of message switch MS and address decode switches ADS–1 through ADS–4 are coupled in common and serve to respectively select the desired message and address of the particular callbox depending on the position of the wiper arms.

PULSE GENERATORS AND GATING NETWORK

The pulse generator includes a time-base generator TG, bit generator BG, word generator WG, and a round counter RC. The time-base generator TG may take various forms, and preferably comprises a free-running astable oscillator having an output frequency on the order of 25 cycles per second. The output signal provided by time-base generator TG preferably takes the form of a train of rectangular wave pulses which are applied through a resistor 22 to the base of transistor 18. The output signal of time-base generator TG is also applied through a resistor 28 and an inverter 30, to the trigger input T of a bistable multivibrator FF1 of bit generator BG. Inverter 30 and the other inverters employed in the preferred embodiment of the present invention, preferably take the form of one-sixth of a Hex inverter, Model MC 789P, manufactured by Motorola Semiconductor Products, Inc. The bistable multivibrator FF1, as well as the other bistable multivibrators employed in the preferred embodiment, preferably takes the form of one-half of a Dual J–K flip-flop, Model MC 790P, manufactured by Motorola Semiconductor Products, Inc., or the equivalent. Conventionally, such a bistable multivibrator or flip-flop is labeled with terminals 1 and 0, for the two stable slats of the multivibrator together with a label R for reset, label S for set, label C for the clear input, and label T for the trigger input. All of the reset terminals R of the seven bistable multivibrators FF1 through FF7 are connected in common to a reset line, and thence through a pair of resistors 32 and 34 to the power supply circuit PS.

Bit generator BG includes bistable multivibrators FF1 and FF2 in which terminal O of multivibrators FF1 is connected to the trigger terminal T of multivibrator FF2. The trigger terminal T of multivibrator FF1 is connected through a resistor 36 to a C-supply source, and through an inverter 38 to one of the inputs of a NOR-gate G1. Nor-gates G1 through G7, preferably take the form of one-third of a triple, three-input gate, Model MC 792P, manufactured by Motorola Semiconductor Products, Inc., or the equivalent. Each of these NOR gates include three input terminals, and provide a positive output signal, known as a binary "1" signal, when each of the input terminals receives a binary "0" signal, or a signal equal to approximately ground potential. When a binary "1" signal is applied to any of the input terminals, the output signal takes the form of a binary "0" signal.

Terminal 1 of multivibrator FF1 is connected through an inverter 40 to a second input terminal of NOR-gate G1, and terminal 1 of multivibrator FF2 is connected through an inverter 42 to a third input terminal of NOR-gate G1. The first input terminal of NOR-gates G1 through G4 are connected in common, the second input terminal of NOR-gate G1 is connected to the second input terminal of Nor-gate G3, and the third input terminal of NOR-gate G1 is connected to the second input terminal of NOR-gate G2, Also, the second input terminal of NOR-gate G1 is connected through an inverter 44 to the third input terminal of NOR-gate G2 and the second input terminal of NOR-gate G4. The second input terminal of gate G2 is connected through an inverter 46 to the third input of NOR-gate G4, and the third input terminal of gate G4 is connected directly to the third input of gate G3.

Word generator WG includes three bistable multivibrators FF3, FF4, and FF5, and the trigger input T of each multivibrator is connected to terminal O of the preceding multivibrator. Also, trigger terminal T of multivibrator FF3 is connected to terminal O of multivibrator FF2. As illustrated, the 1 terminals of multivibrators FF3 through FF5 are connected to the input terminals of NOR-gates G29, G31, and G33, respectively. The output terminals of NOR-gates G29, G31, and G33 are respectively connected to the input terminals of NOR-gates G32, G30, and G34, and are respectively connected through inverters I1, I2, and I3 to the third, second, and first input terminals of NOR-gate G6. Also, the output terminals of NOR-gates G32, G30, and G34 are respectively connected through inverters 48, 50, and 52 to the third, second, and first input terminals of NOR-gate G5.

Round counter RC includes a pair of bistable multivibrators FF6 and FF7, wherein the trigger terminal T of FF7 is connected directly to terminal O of multivibrator FF6 and to the first input of a NOR-gate G8. The second input of NOR-gate G8 is connected to terminal 1 of multivibrator FF7, and the third input of gate G8 is connected directly to ground. The output of NOR-gate G8 is connected through an inverter I8 and a resistor 34 to the reset terminal R of each of the multivibrators FF1 through FF7.

As shown, NOR-gates G1 through G7 are connected to selected ones of a set of four-terminal NOR-gates G9 through G28. Each of the NOR-gates G9 through G28 preferably take the form of one-third of a dual four-input gate, Model MC 725P, manufactured by Motorola Semiconductor Products, Inc., or the equivalent. NOR-gate G1 is connected through an inverter 54 to the fourth terminal of NOR-gates G9, G13, G17, G21, and G25; NOR-gate G2 is connected through an inverter 56 to the fourth terminal of NOR-gates G10, G14, G18, G22, and G26; NOR-gate G3 is connected through an inverter 58 to the fourth terminal of NOR-gates G11, G15, G19, G23 and G27; and, NOR-gate G4 is connected through an inverter 60 to the fourth terminal of NOR-gates G12, G16, G20, G24, and G28.

Figure 2A:
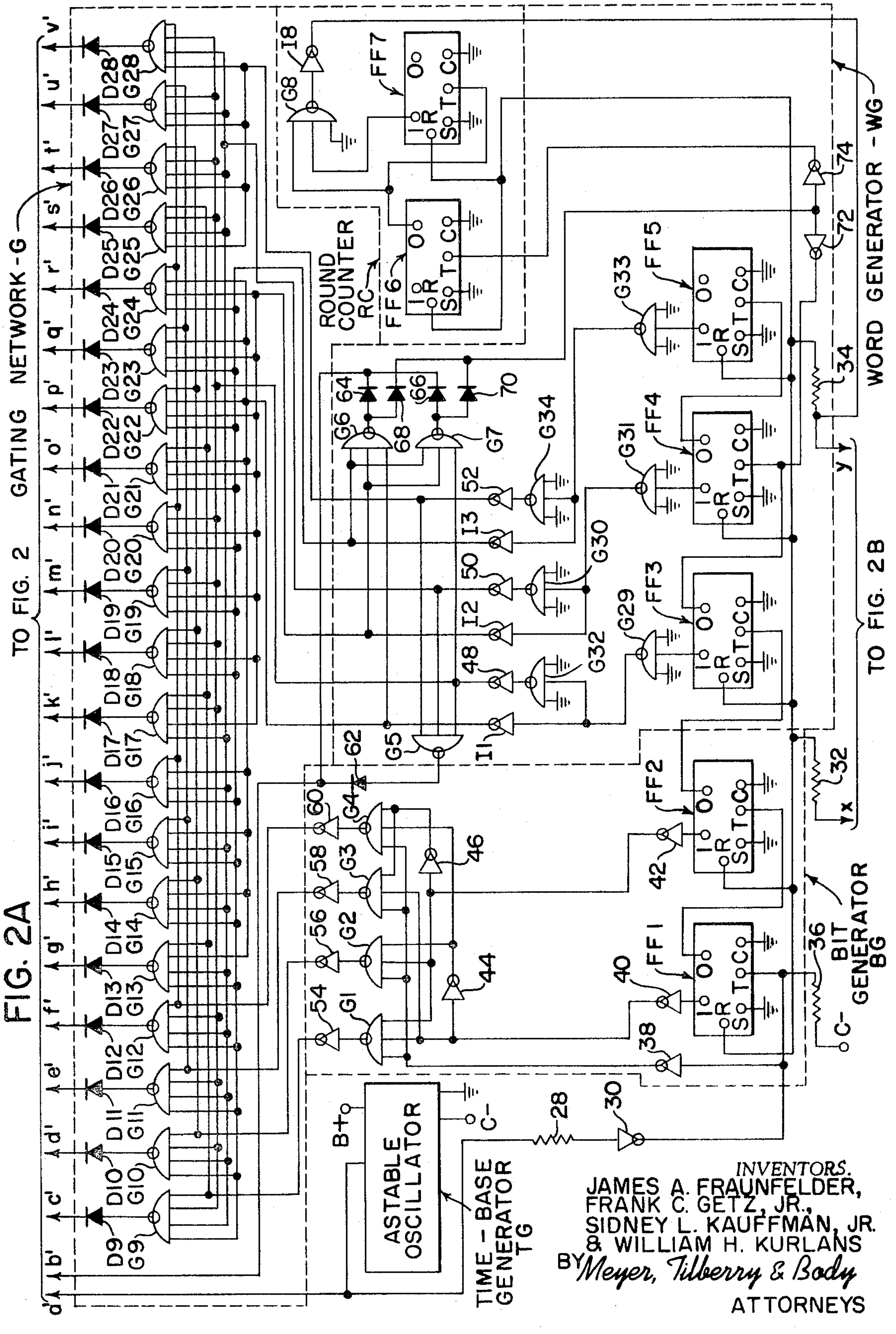

NOR-gate G5 is connected through a diode 62, poled as shown in FIG. 2A, and resistor 24 to the base of transistor 18 in frequency-shift network FS. Similarly, the outputs of NOR-gates G6 and G7 are respectively connected to the anodes of a pair of diodes 64 and 66, the cathodes of which are connected in common through resistor 24 to the base of transistor 18. Also, the outputs of NOR-gates G6 and G7 are connected to the anodes of a pair of diodes 68 and 70, the cathodes of which are connected in common through an inverter 72 to the trigger terminal T of multivibrator FF5. The common-connected cathodes of diodes 68 and 70 are also connected through an inverter 74 to the trigger terminal T of multivibrator FF6.

As shown in FIG. 2A, the third input of NOR-gate G6 is connected to the third input of NOR-gates G13 through G16 and G21 through G24. The second input of NOR-gate G6 is connected to the second input of NOR-gates G17 through G24, and the first input of NOR-gate G6 is connected to the first input of NOR-gates G9 through G16 and G18 through G24. Similarly, the first input of NOR-gate G5 is connected to the first input of NOR-gates G25 through G28, and the second input of NOR-gate G5 is connected to the second input of NOR-gates G9 through G17 and G25 through G28. Also, the third input of NOR-gate G5 is connected to the third input of NOR-gates G9 through G12, G17 through G20, and G25 through G28.

NOR-gates G9 through G12 are connected respectively through a set of diodes D9 through D12 to the wiper arms of sections M1 through M4, respectively, of message switch MS. Similarly, NOR-gates G13 through G28 are respectively connected through diodes D13 through D28, poled as shown in FIG. 2A, to sections A1 through A16, respectively, of the thousands switch ADS–1, hundreds switch ADS–2, tens switch ADS–3, and units switch ADS–4.

As shown in FIG. 2, contacts 9 and 10 of sections M4, A4, A8, A12, and A16 of the address and message decade switches S are connected to the base of transistor 20 in frequency-shift network FS. Similarly, contacts 5 through 8 of sections M3, A3, A7, A11, and A15; contacts 3, 4, 7, and 8 of sections M2, A2, A6, A10, and A14; and, contacts 2, 4, 6, 8, and 10 of sections M1, A3, A5, A9, and A13 of switches S are connected in common to the base of transistor 20.

POWER SUPPLY

Figure 2B:
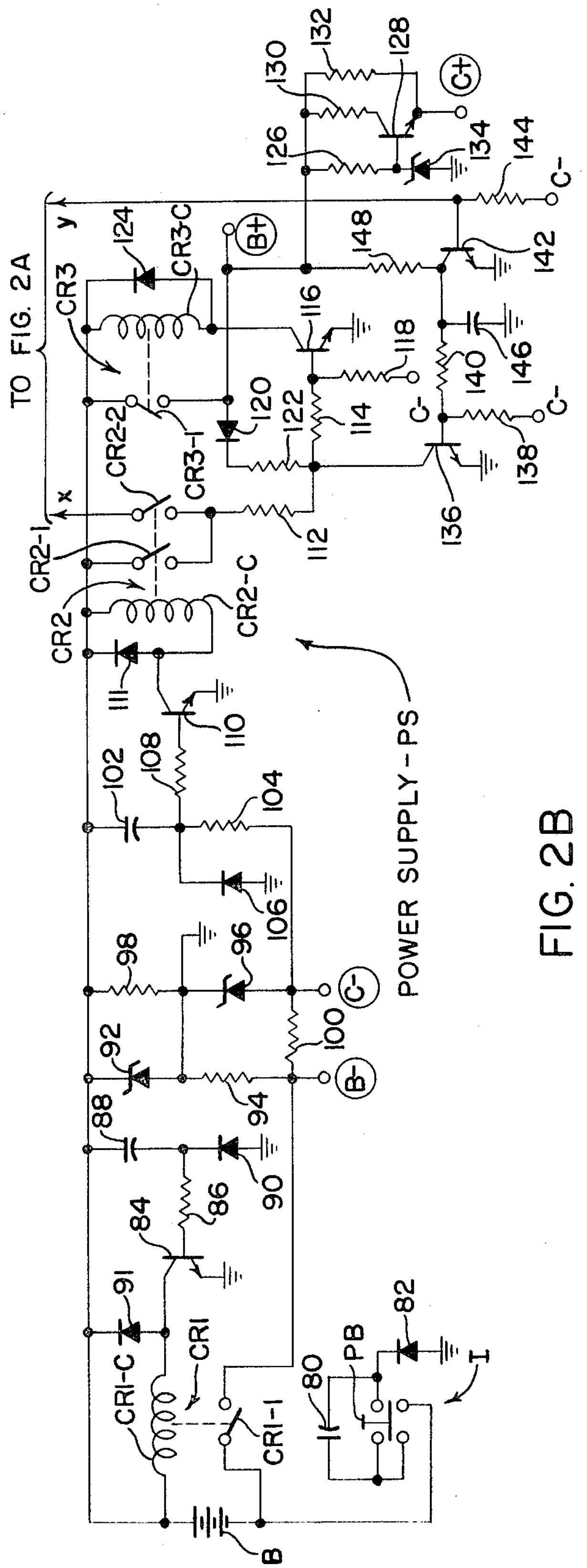

The power supply PS serves to provide the B+, B–, C+, and C– voltage potentials for the transmitter. Power supply PS includes an initiator I, which may take the form of a normally open momentary switch PB, connected between the negative side of a battery B and ground through a capacitor 80 and a diode 82, poled as shown in FIG. 2B. Power supply PS also includes a relay CR1 having a coil CR1–C and a pair of normally open contacts CR1–1. Contacts CR–1 are connected between the negative side of battery B and the B– output terminal. Relay coil CR1–C is connected to the positive polarity terminal of battery B and thence to the collector of an NPN-transistor 84, having its emitter connected directly to ground. The base of transistor 84 is connected through a resistor 86 and thence to the junction of a capacitor 88 and a diode 90, poled as shown in FIG. 2B, which form a series circuit between the positive polarity terminal of battery B and ground. A diode 91, poled as shown, is connected in parallel with coil CR1–C. A Zener diode 92, poled as shown, is connected in series with a resistor 94 between the positive polarity terminal of battery B and the B– output terminal. A second Zener diode, poled as shown, is connected in series with a resistor 98 between the positive polarity terminal of battery B and a C– terminal. The junction between Zener diodes 92 and 96, and resistors 98 and 94, respectively, are connected to ground, and terminals B− and C− are coupled together through a resistor 100.

The positive terminal of battery B is also connected through a capacitor 102 and thence through a resistor 104 to the C− terminal. The junction between capacitor 102 and resistor 104 is connected through a diode 106, poled as shown, and thence to ground. This junction is also connected through a resistor 108 to the base of an NPN-transistor 110, having its emitter connected to ground and its collector connected through coil CR2–2 of a relay CR2, to the positive polarity terminal of battery B. A diode 111, poled as shown, is connected in parallel with relay coil CR2–2, Relay CR2 also includes a pair of normally open relay contacts CR2–1 and CR2–2. Contacts CR2–2 are connected between one terminal of contact CR2–1 and resistor 32 of bit generator BG. The other terminal of relay contacts CR2–1 is connected to the positive polarity terminal of battery B. The junction between relay contacts CR2–1 and CR2–2 is connected through a pair of series-connected resistors 112 and 114 to the base of an NPN-transistor 116 having its emitter connected directly to ground. The base of transistor 116 is connected through a resistor 118 to the C− terminal, and the collector of this transistor is connected through the coil CR3–C of a relay CR3 to the positive polarity terminal of battery B. Relay CR3 also includes a set of normally open relay contacts CR–1 having one terminal thereof connected to the positive polarity terminal of battery B, and the other terminal connected through a diode 120, poled as shown in FIG. 2B and a resistor 122 to the junction between resistors 112 and 114. A diode 124, poled as shown, is connected in parallel with relay coil CR–C of relay CR3.

The junction between relay contacts CR3–1 and diode 120 provides the B+ terminal. This junction is also connected through a resistor 126 to the base of an NPN-transistor 128, through a resistor 130 to the collector of this transistor, and through a resistor 132 to the emitter of this transistor. A Zener diode 134, poled as shown in FIG. 2B, is also connected between the base of transistor 128 and ground, and the emitter of this transistor also provides the C+ output terminal for the power supply PS.

The junction between resistors 112 and 122 is connected to the collector of an NPN-transistor 136 having the emitter thereof connected directly to ground. The base of transistor 136 is connected through a resistor 138 to the C− terminal, and through a resistor 140 to the collector of an NPN-transistor 142. The emitter of transistor 142 is connected directly to ground, and the base of this transistor is connected through a resistor 144 to the C− terminal and through a resistor 34 to the common-connected reset terminals of bistable multivibrators FF1 through FF7. The collector of transistor 142 is connected through a capacitor 146 to ground and through a resistor 148 to the B+ terminal.

TRANSMITTER OPERATION

In the preferred embodiment of the present invention, it is contemplated that a plurality of transmitters be incorporated in an emergency communication system. Accordingly, each transmitter should have its address decade switch ADS positioned in accordance with the address or box number of the respective transmitter. As shown in FIG. 2A, the thousands, hundreds, tens and units address switches are respectively adjusted to present a four-digit decimal number, for example 0835. The message switch MS has ten positions 0 through 9, and it is contemplated that each position be representative of a particular message, such as an ambulance, fire truck, tow truck, et cetera. The message switch MS is positioned as shown to represent the number 2. If desired, the 10-position message switch MS may be replaced by ten different pushbuttons to accomplish the same function by connecting selected ones of the NOR-gates G9 through G12 to the frequency-selecting transistor 20. Such pushbutton switches could be incorporated with the pushbutton PB of the power supply PS. As shown in FIG. 2, however, the transmitters actuated by adjusting the wiper arm of message switch MS to the desired position, representative of the message to be transmitted and then the operator depresses pushbutton PB of the power supply circuit PS.

The circuit including relay CR1 and transistor 84 serves as a latching circuit to provide power for the transmitter for a period which exceeds the time required to transmit three rounds of signals. Accordingly, upon a momentary closure of pushbutton PB, transistor 84 will be biased into conduction, energizing relay CR1. This transistor will continue to conduct until capacitor 88 charges sufficiently to reverse bias the transistor. The time required for this to occur is substantially greater than the time required for the transmitter to complete transmission of three rounds of coded signals. Relay contacts CR1–1 close and serve as a holding circuit after the pushbutton PB has returned to its normally open position. The B− and C− power supply potentials will now appear at terminals B− and C− since the negative terminal of battery B is applied to the anode of diodes 92 and 96, respectively.

Transistor 110 is then biased into conduction, whereupon relay CR2 becomes energized thereby closing contacts CR2–1 and CR2–2. Similarly, transistor 110 will remain conductive until capacitor 102 becomes charged. While transistor 110 is in a conductive state, a forward biased signal is applied through now closed relay contacts CR2–1 to bias transistor 116 into conduction. Also, a positive signal from the positive potential terminal of battery B is applied through now closed contacts CR2–1 and CR2–2 through resistor 32 to the reset terminals R of all binary multivibrators FF1 through FF7. This signal resets all multivibrators. At the reset condition, the output signals appearing at terminals 0 and 1 of multivibrators FF6 and FF7 take the form of a binary "1" signal and a binary "0" signal, respectively. By a binary "1" signal is meant a signal of some positive potential, and by a binary "0" signal is meant a signal equal to approximately ground potential. With a binary "1" signal applied to one of the inputs of NOR-gate G8, the output signal thereof takes the form of a binary "0" signal which is inverted through inverter I8 to thereby apply a binary "1" signal to the base of transistor 142. With a binary "1" signal applied to the base of transistor 142, this transistor becomes forward biased to thereby cause transistor 136 to become reverse-biased. With transistor 136 in a reverse-biased condition, a binary "1" signal is applied through the now closed relay contacts CR2–1 to the base of transistor 116 thereby forward-biasing this transistor. When transistor 116 becomes forward-biased into conduction, relay CR3 becomes energized to thereby cause a B+ potential to be applied to the B+ terminal. With a B+ voltage present at the B+ terminal, transistor 128 is biased into conduction to thereby cause a positive potential to be applied to the C+ terminal.

Once both the C− and B+ terminals are activated, the time-base generator TG commences generation of rectangular wave pulses, which take the form of N words wherein each word is comprised of four consecutive trigger pulses. When the output signal of time-base generator TG changes from a binary "0" signal to a binary "1" signal, the signal applied to the trigger terminal T of bistable multivibrator FF1 takes the form of a signal changing from a binary "1" signal to a binary "0" signal.

When the signal applied to trigger terminal T of multivibrator FF1 changes from a binary "1" to a binary "0" signal, multivibrators FF1 through FF5 commence a counting operation, and each time the applied signal changes from a binary "1" to a binary "0" signal, multivibrators FF1 through FF5 sequence to the next count. The output signals at terminals 1 of multivibrators FF1 and FF2 are inverted through inverters 40, 42, 44 and 46, and when a match is obtained at one of the gates G1 through G5, i.e., binary "0" signals are applied to all of the inputs of a single gate, the output signal takes the form of a binary "1" signal. This binary "1" signal is inverted through inverters 54, 56, 58 or 60, and is applied to selected of the inputs of NOR-gates G9 through G28.

Similarly, the output signals of multivibrators FF3 through FF5 are inverted through NOR-gates G29 through G34, and inverters I1 through I3, are applied to selected ones of the inputs of NOR-gates G5 through G7, and G9 through G28. The output signals from NOR-gates G5 through G7 are applied through diodes 62, 64, 68, 66, and 70 to the base of transistor 18, and also to multivibrators FF6 and FF7 of round counter RC.

The output signals at terminals 0 and 1 of multivibrators FF6 and FF7, respectively, are applied to the input terminals of NOR-gate G8, and when a match is obtained, the output signal of gate G8 takes the form of a binary "1" signal. This binary "1" signal is inverted through inverter I8 and is applied to the base of transistor 142 to thereby reverse-bias this transistor. When transistor 142 becomes reverse-biased, a binary "1" signal will be applied to the base of transistor 136 thereby forward biasing this transistor, which in turn causes transistor 116 to become reverse-biased. As is apparent, when transistor 116 becomes reverse-biased relay coil CR3–3 is deenergized to thereby terminate the B+ signal applied to the transmitter.

When the signals applied to NOR-gates G9 through G28 are such that a match is obtained at one or more of these gates, i.e., binary "0" signals are applied to all of the inputs of a single gate, the output of that gate takes the form of a binary "1" signal. These binary "1" signals are applied through the address and message decade switches S to the base of transistor 20, assuming a circuit is completed from the respective gate through the message and decade switches, to the base of transistor 20. When the output signal at NOR-gates G5 through G7 takes the form of a binary "1" signal, transistor 18 will be forward-biased to place potentiometer P2 in parallel with potentiometer P1 thereby causing the carrier frequency $f_r$ to be transmitted, assuming transistor 20 is reverse-biased. When transistor 20 is forward-biased, potentiometer P3 is placed in parallel with potentiometer P1 thereby causing the oscillator to shift to the high frequency $f_i$ condition. When transistors 18 and 20 are reverse-biased, the oscillator frequency shifts to the low frequency $f_2$ condition.

Referring now to Table I, there is tabulated the condition of bistable multivibrators FF1 through FF5, NOR-gates G1 through G28, and the condition of the output frequency relative to the number of pulses provided by time-base generator TG.

As illustrated in Table I, upon actuation of initiator I, each of the multivibrators FF1 through FF5 is reset, i.e., the signal appearing at terminal 1 takes the form of a binary "0" signal and the signal appearing at terminal 0 takes the form of a binary "1" signal. At this condition, a binary "1" signal will be applied to at least one terminal of each of the NOR-gates G1 through G28 with the exception of NOR-gates G4 and G6; therefore, the output signal of all the NOR gates, with the exception of these two, will take the form of a binary "0" signal. The binary "1" signal developed at the output of NOR-gate G4 is inverted through inverter 60 to thereby apply a binary "0" signal to one of the input terminals of NOR-gates G12, G16, G20, and G28; however, since a binary "1" signal is applied to at least one of the other input terminals of these NOR gates, the output signals thereof remain at a binary "0" level. The output signal of NOR-gate G5 takes the form of a binary "1" signal which is applied to the base of transistor 18 thereby forward-biasing this transistor. With transistor 18 in a forward-biased condition, potentiometer P2 is placed in parallel with potentiometer P1 to thereby cause the frequency of oscillator circuit O to shift to the intermediate or carrier frequency. As readily apparent, the binary "0" signals developed at the outputs of NOR-gates G9 through G28, irrespective of the position of address and message decade switches S, cause transistor 20 to become reverse-biased thereby preventing potentiometer P3 from being connected in parallel with potentiometer P1.

Upon receipt of the first pulse from time-base generator TG, the signal applied to trigger terminal T of bistable multivibrator FF1 changes from a binary "1" signal to a binary "0" signal thereby causing multivibrators FF1 through FF5 to be sequenced to the first count. Upon receipt of this signal, the signal developed at terminal 1 of multivibrators FF1 through FF5 takes the form of a binary "1" signal, which when applied through the respective inverters, causes a binary "1" signal to be applied to at least one input terminal of each of the NOR-gates G2 through G28 with the exception of gate G5. Therefore, the output signal of each NOR gate, except gates G1 and G5, takes the form of a binary "0" signal. The binary "1" signal developed at the output of NOR-gate G1 is inverted through inverter 54 and is applied to one of the inputs of NOR-gates G9, G13, G17, G21, and G25; however, since a binary "1" signal is applied to another one of the input terminals of each of these NOR gates, the output signal remains at a binary "0" level. The binary "1" signal developed at the output of NOR-gate G5 is applied through diode 62 to the base of transistor 18 to thereby cause this transistor to remain forward biased. As before, the binary "0" signals developed at the out-

TABLE I.—TRANSMITTER TRUTH TABLE

| Pulse No. | Output signal (volts) FF 1 1 0 | FF 2 1 0 | FF 3 1 0 | FF 4 1 0 | FF 5 1 0 | Gates activated | Output frequency | Binary code transmitted (least significant first) | Decimal number transmitted |
|---|---|---|---|---|---|---|---|---|---|
| 0 | 0 2 | 0 2 | 0 2 | 0 2 | 0 2 | G4, G6 | Carrier | | |
| 1 | 2 0 | 2 0 | 2 0 | 2 0 | 2 0 | G1, G5 | do | | |
| 2 | 0 2 | 2 0 | 2 0 | 2 0 | 2 0 | G2, G5 | do | | |
| 3 | 2 0 | 0 2 | 2 0 | 2 0 | 2 0 | G3, G5 | do | | |
| 4 | 0 2 | 0 2 | 2 0 | 2 0 | 2 0 | G4, G5 | do | | |
| 5 | 2 0 | 2 0 | 0 2 | 2 0 | 2 0 | G1, G9 | Low | "0" | |
| 6 | 0 2 | 2 0 | 0 2 | 2 0 | 2 0 | G2, G10 | High | "1" | |
| 7 | 2 0 | 0 2 | 0 2 | 2 0 | 2 0 | G3, G11 | Low | "0" | |
| 8 | 0 2 | 0 2 | 0 2 | 2 0 | 2 0 | G4, G12 | do | "0" | —2— |
| 9 | 2 0 | 2 0 | 2 0 | 0 2 | 2 0 | G1, G13 | do | "0" | |
| 10 | 0 2 | 2 0 | 2 0 | 0 2 | 2 0 | G2, G14 | do | "0" | |
| 11 | 2 0 | 0 2 | 2 0 | 0 2 | 2 0 | G3, G15 | do | "0" | |
| 12 | 0 2 | 0 2 | 2 0 | 0 2 | 2 0 | G4, G16 | do | "0" | —0— |
| 13 | 2 0 | 2 0 | 0 2 | 0 2 | 2 0 | G1, G17 | do | "0" | |
| 14 | 0 2 | 2 0 | 0 2 | 0 2 | 2 0 | G2, G18 | do | "0" | |
| 15 | 2 0 | 0 2 | 0 2 | 0 2 | 2 0 | G3, G19 | do | "0" | |
| 16 | 0 2 | 0 2 | 0 2 | 0 2 | 2 0 | G4, G20 | High | "1" | —8— |
| 17 | 2 0 | 2 0 | 2 0 | 2 0 | 0 2 | G1, G21 | do | "1" | |
| 18 | 0 2 | 2 0 | 2 0 | 2 0 | 0 2 | G2, G22 | do | "1" | |
| 19 | 2 0 | 0 2 | 2 0 | 2 0 | 0 2 | G3, G23 | Low | "0" | |
| 20 | 0 2 | 0 2 | 2 0 | 2 0 | 0 2 | G4, G24 | do | "0" | —3— |
| 21 | 2 0 | 2 0 | 0 2 | 2 0 | 0 2 | G1, G25 | High | "1" | |
| 22 | 0 2 | 2 0 | 0 2 | 2 0 | 0 2 | G2, G26 | Low | "0" | |
| 23 | 2 0 | 0 2 | 0 2 | 2 0 | 0 2 | G3, G27 | High | "1" | |
| 24 | 0 2 | 0 2 | 0 2 | 2 0 | 0 2 | G4, G28 | Low | "0" | —5— |
| 25 | 2 0 | 2 0 | 2 0 | 0 2 | 0 2 | G4, G7 | Carrier | | |
| 1 | 2 0 | 2 0 | 2 0 | 2 0 | 2 0 | G4, G6 | do | | |

NOTE.—Et cetera for two additional rounds.

puts of NOR-gates G9 through G28, irrespective of the positions of address and message decade switches S, cause transistor 20 to remain reverse-biased. With transistor 18 forward-biased and transistor 20 reverse-biased, the frequency of oscillator 0 remains shifted to the carrier frequency.

As is illustrated in Table I, upon receipt of the first through the fourth pulse by multivibrator FF1, the frequency of oscillator circuit 0 remains shifted to the carrier frequency and therefore the transmitted signal is that of the carrier frequency. Upon receipt of the fifth pulse, the output signal developed at terminal 1 of multivibrators FF1, FF2, FF4, and FF5 takes the form of a binary "1" signal, and the signal developed at the 1 terminal of multivibrator FF3 takes the form of a binary "0" signal. With this pattern of signals, NOR-gate G1 and G9 are actuated, i.e., the output signals thereof take the form of a binary "1" signal. The binary "0" signals developed at the output of NOR-gates G5 through G7 are applied to the base of transistor 18 thereby reverse-biasing this transistor, and the binary "1" signal developed at gate G9 is applied to section M1 of message switch MS. Since the wiper arm of section M1 is not connected to the base of transistor 20, transistor 20 will also remain reverse-biased. With transistors 18 and 20 in reverse-biased conditions, only potentiometer P1 will be connected in parallel with variable capacitive device VC; therefore, the frequency of oscillator circuit 0 will be shifted to the low frequency condition.

As is apparent from Table I, the frequency of the signal transmitted by transmitter T will take the form of a binary-coded decimal signal; however, the least significant figure of the binary-coded decimal number is transmitted first, for example 0010 represents the decimal number 2. In other words, N-words (5 in the preferred embodiment) each containing a series of four consecutive frequency pulses selected from two different frequency levels to form a binary-coded decimal number are transmitted. The coded signal will continue through pulse number 25, and after the 25th pulse the same sequence will continue to repeat for two additional cycles. Each time NOR-gate G6 or G7 is actuated, i.e., the signal developed at the output thereof takes the form of a binary "1" signal, bistable multivibrators FF6 and FF7 of round counter RC are sequenced to the next count. For example, upon being reset, the signals developed at terminal 0 and terminal 1 of multivibrators FF6 and FF7, respectively take the form of a binary "1" and binary "0" signal. With a binary "1" signal applied to one of the inputs of NOR-gate G8, the signal developed at the output thereof takes the form of a binary "0" signal, which after being inverted by inverter 18, causes a binary "1" signal to be applied to the base of transistor 142 thereby causing this transistor to remain forward-biased. When the twenty-fifth pulse is provided by time-base generator TG, NOR-gate G7 is actuated to thereby pulse multivibrators FF6 and FF7 to the second count. During the second and third count of round counter RC, transistor 142 remains forward-biased; however, upon being actuated to the fourth count, i.e., the seventy-fifth pulse developed by time-base generator TG, the signals developed at terminals 0 and 1 of multivibrators FF6 and FF7, respectively, take the form of binary "0" signals. When binary "0" signals are applied to each of the inputs of gate G8, the output signals are applied to each of the inputs of gate G8, the output signal takes the form of a binary "1" signal which when inverted through inverter 18 causes a binary "0" signal to be applied to the base of transistor 142. With a binary "0" signal applied to the base of transistor 142, this transistor will become reverse-biased thereby removing the positive forward bias for transistor 116. When transistor 116 becomes reverse-biased, relay CR3 becomes deenergized, removing the B+ potentials from the circuit, thereby preventing further transmission of the coded signals. The transmitter is now in condition to be activated again by a momentary closure of pushbutton PB.

RECEIVER

Figure 4:
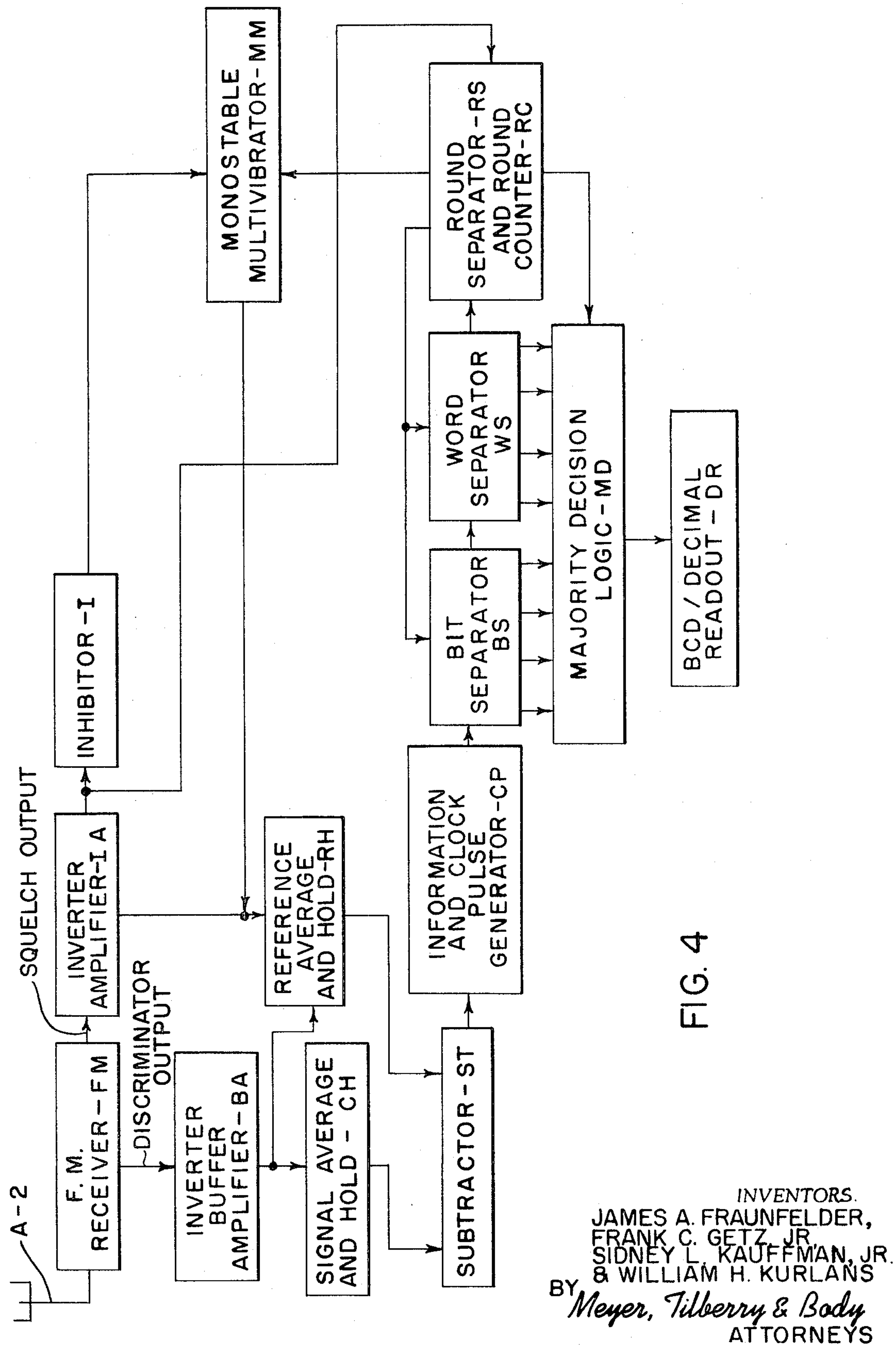
FIG. 4 is a block diagram illustrating a receiver constructed in accordance with the invention; and, FIGS. 5, 5A, 5B, 5C, 5D, and 5E taken together are a combined schematic, block diagram illustrating in greater detail the receiver of FIG. 4.

Referring now to FIG. 4, the receiver is illustrated in block diagram form. As shown, the receiver generally comprises a receiving antenna A–2; a frequency-modulated receiver FM having a squelch output and a discriminator output; an inverter amplifier IA coupled to the squelch output of receiver FM; an inhibitor circuit I connecting inverter amplifier IA to a monostable multivibrator MM; an inverter buffer amplifier BA connecting receiver FM to a signal average and hold circuit CH and a reference average and hold circuit RH; a subtractor circuit ST connecting the signal average circuit CH and reference average circuit RH to an information and clock pulse generator CP; and, a bit separator BS, word separator WS, and round separator RS, coupling the information and clock pulse generator CP through a majority decision logic circuit MD to a BCD (binary-coded decimal) to decimal readout DR. The receiver FM may be a standard frequency-modulated receiver, such as a General Electric MASTER progress line receiver, Type ER-40-A, or equivalent. Such a receiver has two outputs known as the squelch output and the discriminator output. The discriminator output carries a voltage level signal which is of a value directly proportional to the received frequency level. The output of the squelch circuit, in the absence of a received signal, is substantially on the order of 9 volts. This output decreases to substantially 0 volts upon receipt of a signal from the transmitter. Briefly, the inhibitor circuit I serves to sense whether, in fact, a signal has been received from one of the system transmitters. If so, it actuates the gate in the reference average circuit RH and the carrier or reference signal is sampled. The subtractor ST, information and clock pulse generator CP, separators BS, WS, and RS, majority decision logic circuit, and BCD to decimal readout DR serve to process the signals received from one of the system transmitters and then provide a decimal readout.

INVERTER AMPLIFIER AND INHIBITOR

Figure 5A:
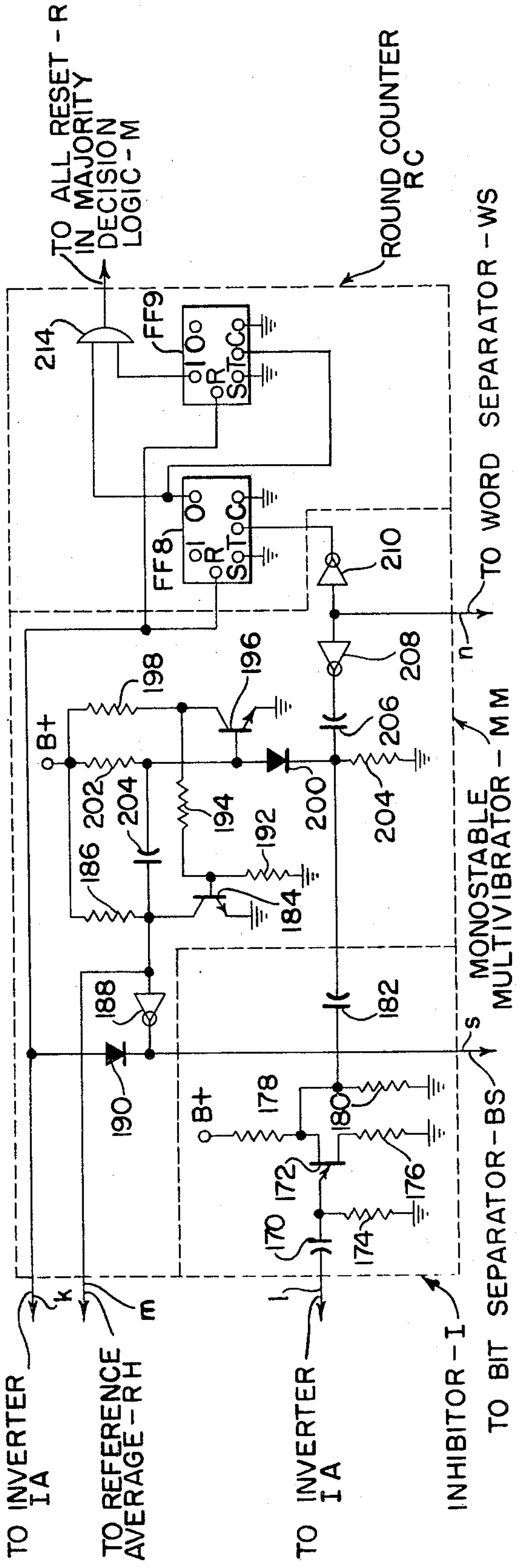
Figure 5:
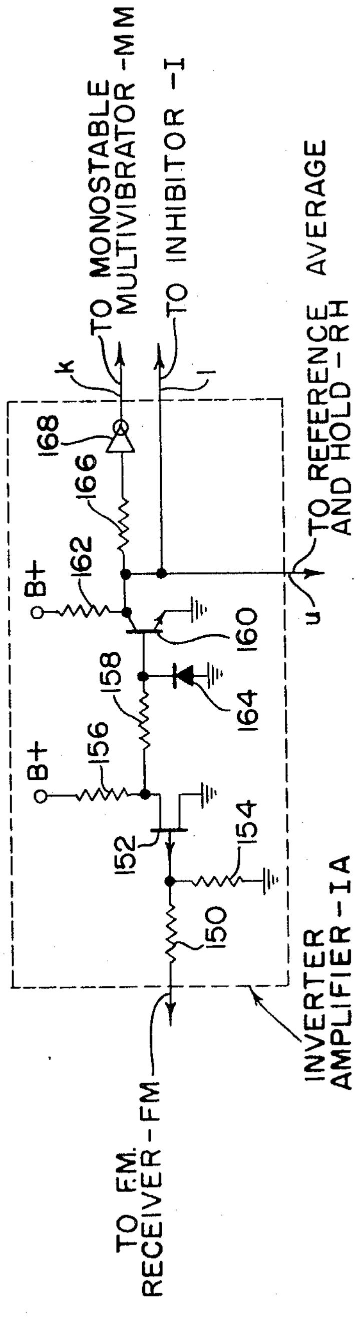

The inverter amplifier IA is illustrated in FIG. 5, and includes a resistor 150 coupled between the squelch output of receiver FM and the gate of a p-channel field-effect transistor. The gate of field-effect transistor 152 is also connected through a resistor 154 to ground, the drain terminal is connected through a resistor 156 to the B+ source supply, and the source terminal is connected directly to ground. The drain terminal of field-effect transistor 152 is connected through a resistor 158 to the base of an NPN-transistor 160 having its collector connected through a resistor 162 to the B+ source supply and the emitter thereof is connected directly to ground. Also connected to the base of transistor 160 is the cathode of a diode 164 having its anode connected directly to ground. The collector of transistor 160 provides output terminals *l*, *u*, of inverter amplifier IA which are connected to inhibitor I and reference average and hold circuit RH, respectively. Also, the collector of transistor 160 is connected through a resistor 166 and an inverter 168 to terminal *k* of inverter amplifier IA.

Inhibitor I includes a capacitor 170 connected between terminal *l* of inverter amplifier IA and the emitter of a unijunction transistor 172. The emitter of transistor 172 is also connected through a resistor 174 to ground, the first base is connected through a resistor 176 to ground, and the second base is connected through a resistor 178 to the B+ source supply. Also, the second base of unijunction transistor 172 is connected through a resistor 180 to ground, and through a capacitor 182 to monostable multivibrator MM.

MONOSTABLE MULTIVIBRATOR

Monostable multivibrator MM, as is illustrated in FIG. 5A, includes an NPN-transistor 184 having the collector thereof connected through a resistor 186 to the B+ source supply, and to a terminal N of reference average and hold circuit RH. The collector of this transistor is also connected to the input of an inverter 188 having its output connected to a terminal S of bit separator BS and to the cathode of a diode 190. The anode of diode 190 is connected directly to terminal *k* of inverter amplifier IA. The emitter of transistor 184 is connected directly to ground and the base of this transistor is connected through a resistor 192 to ground and through a resistor 194 to the collector of a transistor 196. As illustrated, the collector of transistor 196 is connected through a resistor 198 to the B+ source supply, the base of this transistor is connected to the anode of a diode 200, and the emitter is connected directly to ground. Also, the base of transistor 196 is connected through a resistor 202 to the B+ supply source, and through a capacitor 204 to the collector of transistor 184. The cathode of diode 200 is connected to capacitor 182 of inhibitor I, through a resistor 204 to ground, and through a capacitor 206 to the output of an inverter 208. Connected to the input of inverter 208 is a terminal *n* of word separator WS and the input of an inverter 210. The output of inverter 210 is connected to the trigger terminal T of a bistable multivibrator FF8 in the round counter RC. The 0 terminal of bistable multivibrator FF8 is coupled to one of the input terminals of a NOR-gate 214 and to the trigger terminal T of a bistable multivibrator FF9. Connected to the one terminal of bistable multivibrator FF9 is the other input terminal of NOR-gate 214. Each of the reset terminals *r* of bistable multivibrators FF8 and FF9 are connected to the anode of diode 190 and to the terminal *k* of inverter amplifier IA, and the output of NOR-gate 214 provides the reset terminal *r* for all bistable multivibrators in the majority decision logic circuit MD.

SIGNAL AVERAGE AND REFERENCE AVERAGE CIRCUITS

Figure 5B:
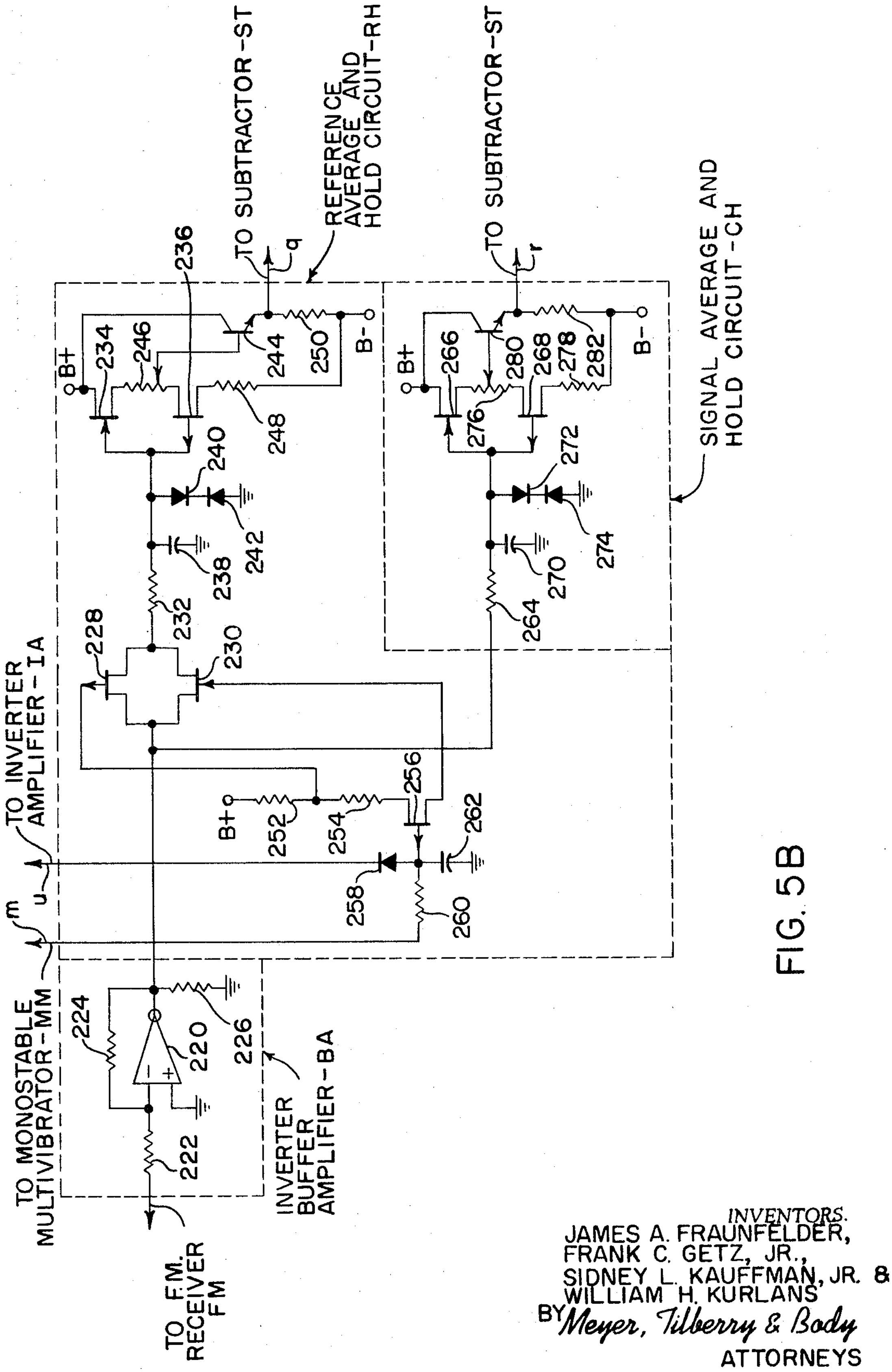

As illustrated in FIG. 5B, inverter buffer amplifier BA includes an amplifier 220 having the negative polarity input terminal connected through a resistor 222 to the discriminator output of receiver FM, and the positive polarity input terminal is connected directly to ground. The output of amplifier 220 is connected through a resistor 224 to the negative polarity input terminal, through a resistor 226 to ground, and to reference average and hold circuit RH.

Reference average and hold circuit RH includes a p-channel field-effect transistor 228 having the source terminal thereof connected to the output of amplifier 220 and to the drain terminal of an n-channel field-effect transistor 230. The source terminal of field-effect transistor 230 is connected through a resistor 232 to the gates of a pair of n-channel field-effect transistors 234 and 236, and to the drain terminal of field-effect transistor 228. Also connected to the common-connected gates of field-effect transistors 234 and 236 is one terminal of a capacitor 238 having the other terminal thereof connected directly to ground. In addition, a pair of series-connected diodes 240 and 242, poled as shown in FIG. 5B, are connected between the gates of field-effect transistors 234 and 236, and ground. The drain terminal of field-effect transistor 234 is connected directly to the B+ source supply and to the collector of an NPN-transistor 244. The source terminal of field-effect transistor 234 is connected through a variable resistor 246 to the drain terminal of field-effect transistor 236, and the source terminal of this transistor is connected through a resistor 248 to the B− source supply. The adjustable terminal of potentiometer 246 is connected to the base of transistor 244 and the emitter of this transistor is connected through a resistor 250 to the B− source supply. Also, the emitter of transistor 244 provides the output terminal *q* of reference average and hold circuit RH.

Connected to the gate of field-effect transistor 228 is the junction between a pair of series-connected resistors 252 and 254. The other terminal of resistor 252 is connected directly to the B+ source supply, and the other terminal of resistor 254 is connected to the drain terminal of a p-channel field-effect transistor 256. Connected to the gate of field-effect transistor 256 is the anode of a diode 258 having its cathode connected to terminal *u* of inverter amplifier IA. Also, the gate of field-effect transistor 256 is connected through a resistor 260 to terminal *m* of monostable multivibrator MM, and through a capacitor 262 to ground.

The junction between source terminal of field-effect transistor 228 and drain terminal of field-effect transistor 230 is connected through a resistor 264 to the common-connected gates of a pair of n-channel field-effect transistors 266 and 268. These common-connected gates are also connected through a capacitor 270 to ground, and through a pair of series-connected diodes 272 and 274, poled as shown in FIG. 5B, to ground. The source terminal of field-effect transistor 266 is connected through the stationary portion of a potentiometer 276 to the drain terminal of field-effect transistor 268, the source terminal of transistor 268 is connected through a resistor 278 to the B− source supply, and the drain terminal of transistor 266 is connected directly to the B+ source supply. Connected to the moveable terminal of potentiometer 276 is the base of an NPN-transistor 280 having its collector connected directly to the B+ source supply, and its emitter is connected through a resistor 282 to the B− source supply. Also, the emitter of transistor 280 provides output terminal R of signal average and hold circuit CH.

SUBTRACTOR AND INFORMATION AND CLOCK PULSE GENERATOR

Figure 5C:
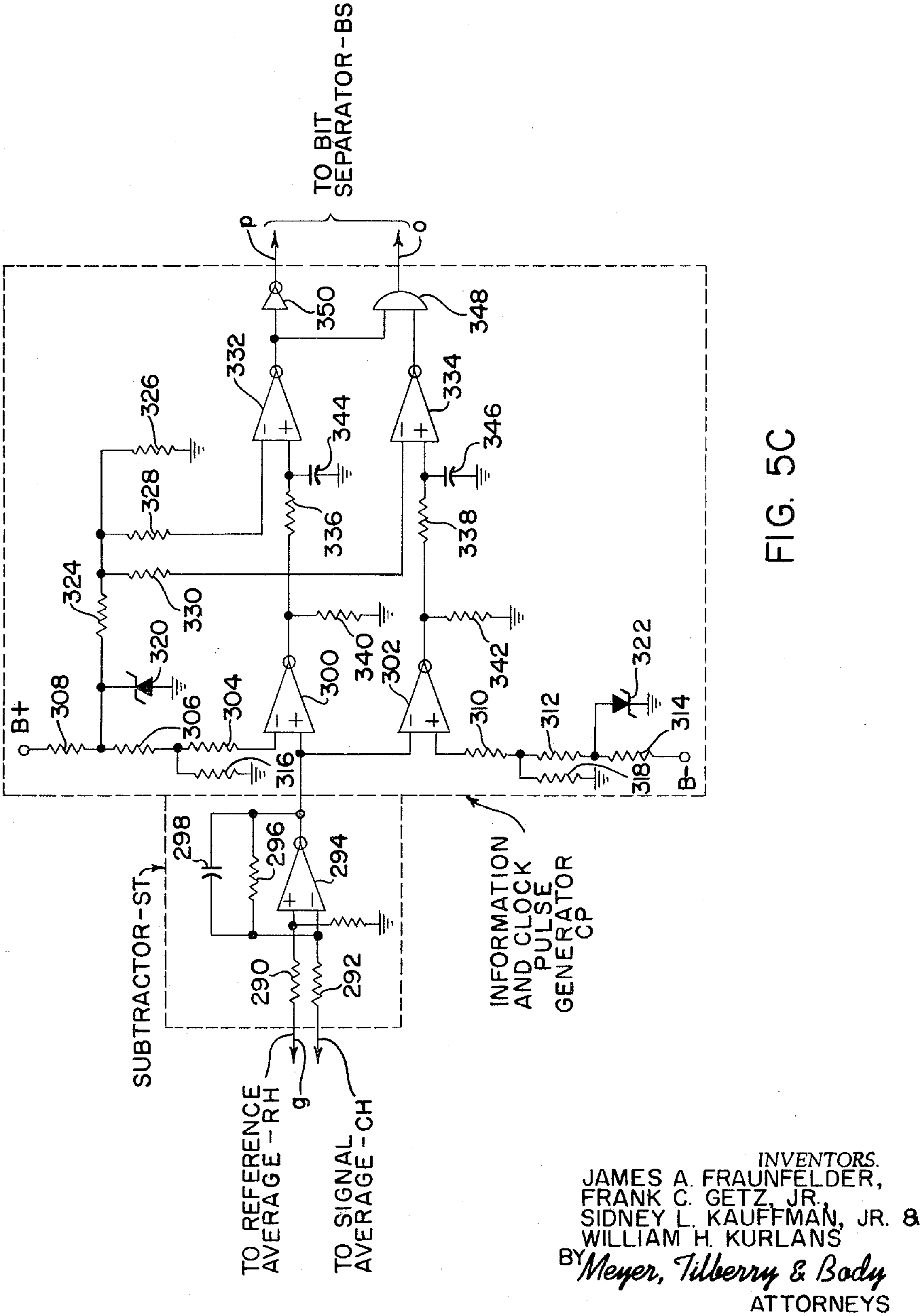

Terminals *q* and *r* of reference average circuit RH and signal average circuit CH, respectively, are connected through resistors 290 and 202 to the positive and negative polarity input terminals, respectively, of an amplifier 294. A network comprised of a parallel-connected resistor 296 and capacitor 298 is connected between the output of amplifier 294 and the negative polarity input terminal thereof. Also connected to the output of amplifier 294 is the positive polarity input terminal of a differential comparator amplifier 300 in the information and clock-pulse generator CP. The positive polarity terminal of amplifier 300 is connected to the negative polarity terminal of a differential comparator amplifier 302, and the negative polarity terminal of differential amplifier 300 is connected through three series-connected resistors 304, 306, and 308 to the B+ source supply. Similarly, the positive polarity terminal of amplifier 302 is connected through three series-connected resistors 310, 312, and 314 to the B− source supply. The junction between resistors 304 and 306, and the junction between resistors 310 and 312 are connected through resistors 316 and 318, respectively, to ground. Also, the junction between resistors 306 and 308, and between resistors 312 and 314 are connected through Zener diodes 320 and 322, poled as shown in FIG. 5C, respectively to ground.

The junction between resistors 306 and 308 is also connected through a pair of series-connected resistors 324 and 326 to ground. As illustrated, the junction between resistors 324 and 326 is connected through resistors 328 and 330 to the negative polarity terminals of a pair of differential comparator amplifiers 332 and 334, respectively. The positive polarity terminal of differential amplifier 332 is connected through a resistor 336 to the output terminal of amplifier 300, and the positive polarity terminal of amplifier 334 is connected through a resistor 338 to the output terminal of differential amplifier 302. The output terminals of differential amplifiers 300 and 302 are connected through resistors 340 and 342, respectively, to ground, and the positive polarity input terminals of differential amplifiers 332 and 334 are connected through capacitors 344 and 346, respectively, to ground. Connected to the output terminals of amplifiers 332 and 334 are the input terminals of a NOR-gate 348 having its output terminal connected to terminal 0 of bit separator BS. Also connected to the output terminal of amplifier 332 is the input terminal of an inverter 350 having its output connected to terminal *p* of bit separator BS.

BIT, WORD, AND ROUND SEPARATORS

Figure 5D:
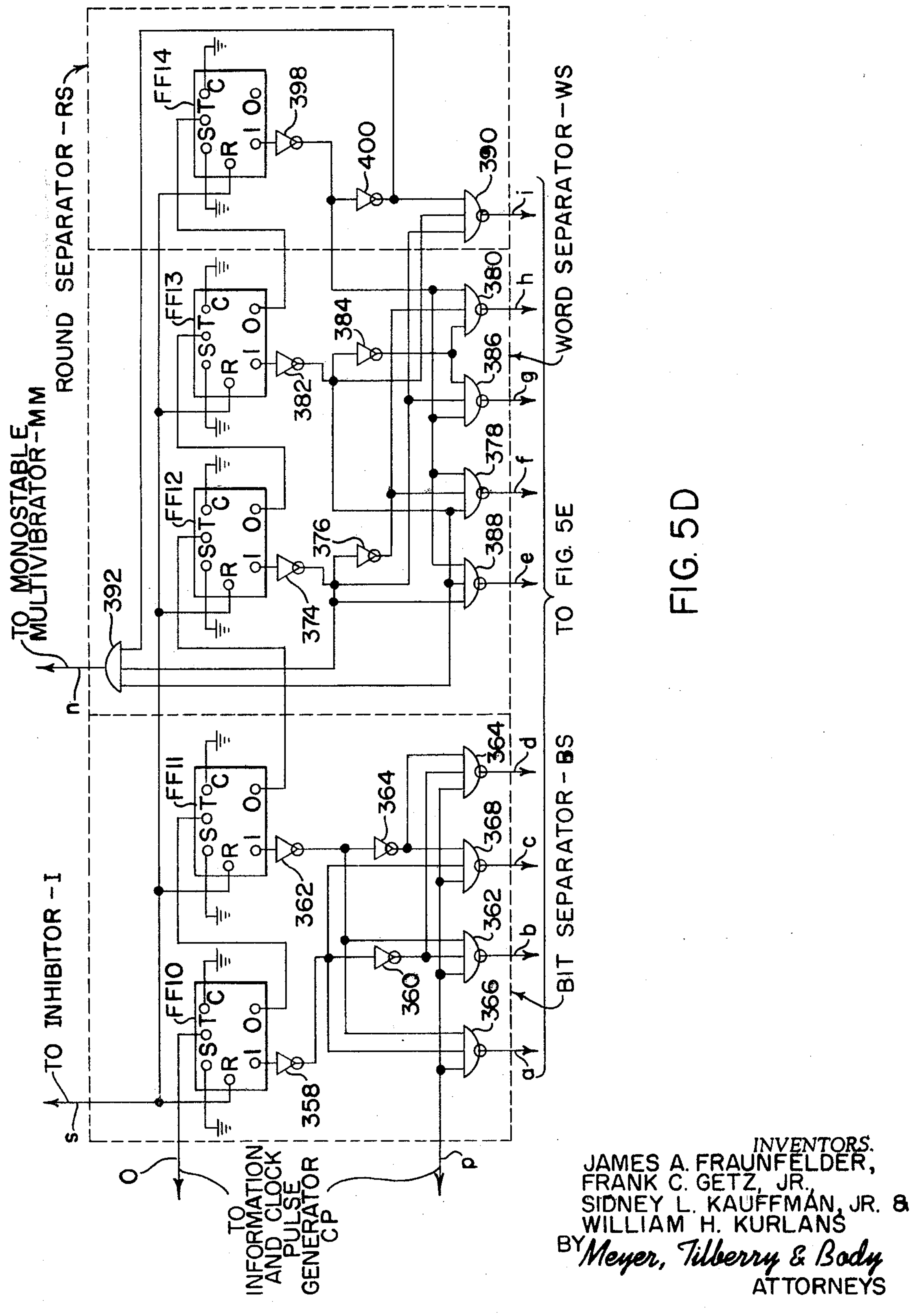

As is more particularly illustrated in FIG. 5D, bit separator BS includes a pair of bistable multivibrators FF10 and FF11, wherein the 0 terminal of multivibrator FF10 is connected the trigger terminal T of multivibrator FF11. Connected to the trigger terminal T of multivibrator FF10 is terminal *o* of the information and clock pulse generator CP. The 1 terminal of bistable multivibrator FF10 is connected through a pair of series-connected inverters 358 and 360 to the second input terminal of a NOR-gate 362. Similarly, the 1 terminal of multivibrator FF11 is connected through a pair of series-connected inverters 362 and 364 to the third input of a NOR-gate 364. The junction between inverters 362 and 364 is connected to the third input terminal of gate 362 and the third input terminal of a NOR-gate 366. The second input terminal of gate 366 is connected to the second input terminal of a NOR-gate 368, and the second input terminal of gate 362 is connected to the second input terminal of gate 364. The third input terminal of NOR-gate 364 is connected to the third input terminal of gate 368, and the first input terminal of NOR-gates 362 through 368 are connected in common to terminal $p$ of information and clock pulse generator CP.

Word separator WS includes a pair of bistable multivibrators FF12 and FF13, wherein the 0 terminal of multivibrator FF12 is connected to the trigger terminal T of multivibrator FF13. Connected to the trigger terminal T of multivibrator FF12 is the 0 terminal of multivibrator FF11 in the bit separator BS. Terminal 1 of bistable multivibrator FF12 is connected through a pair of series-connected inverters 374 and 376 to the second input terminals of a pair of NOR-gates 378 and 380. Similarly, terminal 1 of multivibrator FF13 is connected through a pair of series-connected inverters 382 and 384 to the first and third terminals of NOR-gate 380 and a NOR-gate 386, respectively. The junction between inverters 374 and 376 is connected to the first input terminal of a NOR-gate 388, second input terminal of gate 386, and first input terminal of a NOR-gate 390. Similarly, the junction between inverters 382 and 384 is connected to the second input terminal of gate 388, first input terminal of gate 378, and second input terminal of gate 390. Connected to the second input terminal of NOR-gate 388 is the first input terminal of a NOR-gate 392 having its output terminal connected to terminal $n$ of monostable multivibrator MM.

As illustrated, round separator RS includes a bistable multivibrator FF14 having the trigger terminal T thereof connected to terminal 0 of multivibrator FF13 in word separator WS. Terminal 1 of multivibrator FF14 is connected through a pair of series-connected inverters 398 and 400 to the third input terminals of NOR-gates 390 and 392. The junction between inverters 398 and 400 is connected to the third input terminal of NOR-gate 380. Reset terminals R of bistable multivibrators FF10, FF11, FF12, FF13, and FF14 are connected in common to terminal $s$ of inhibitor I.

MAJORITY DECISION LOGIC CIRCUIT MD

Figure 5E:
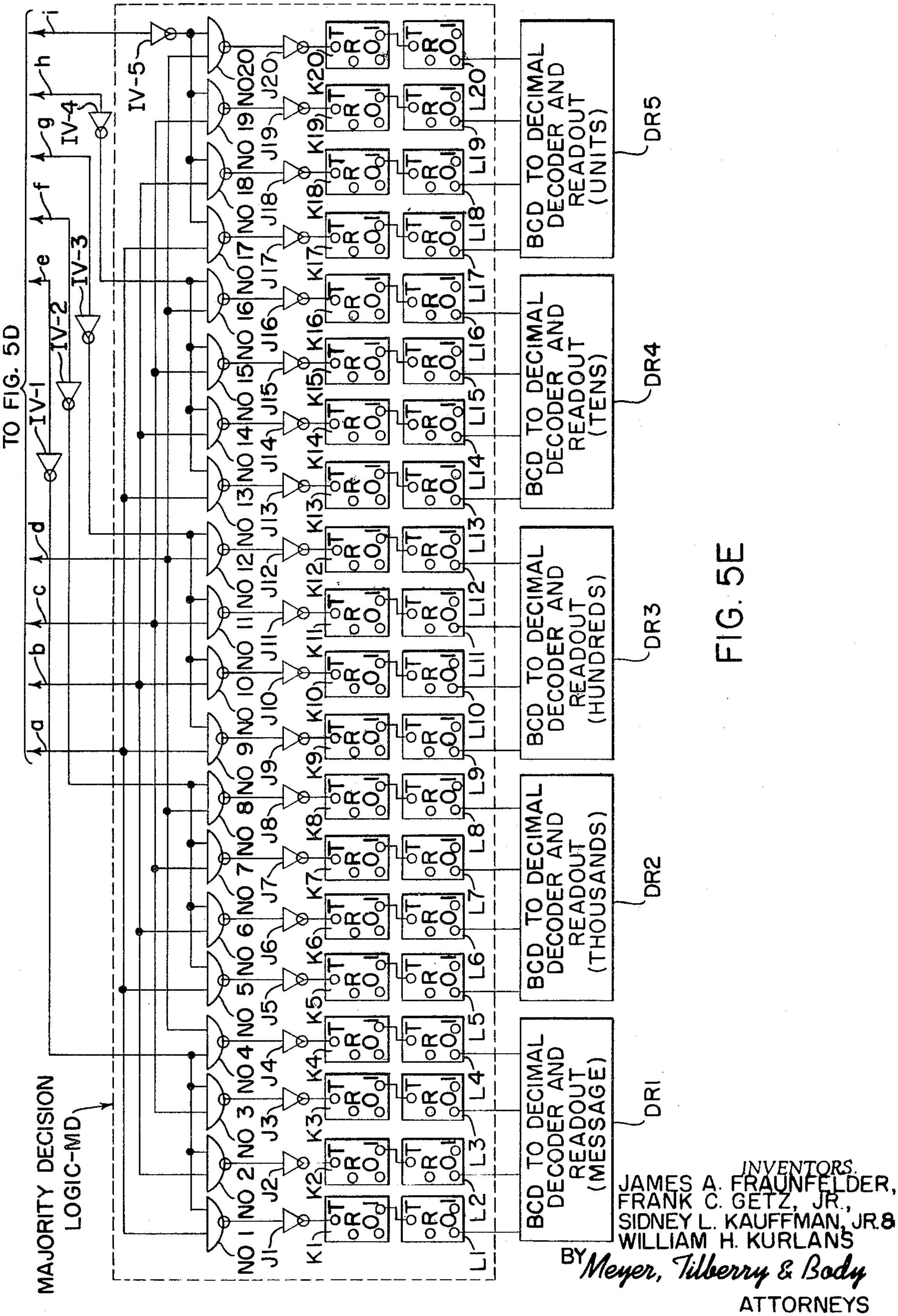

Referring to FIG. 5E, majority decision logic circuit MD includes twenty NOR-gates NO–1 through NO–20 having the input terminals thereof connected to selected ones of the output terminals of NOR-gates 362 through 366, 378, 380 and 386 through 390. The output terminals of NOR-gates NO–1 through NO–20 are connected through a set of inverters J–1 through J–20, respectively, to the trigger terminals T of bistable multivibrators K–1 through K–20, respectively. Further, terminals 1 of bistable multivibrators K–1 through K–20 are connected to the trigger terminal T of a set of bistable multivibrators L–1 through L–20, respectively. The signals developed at terminals 0 of multivibrators L–1 through L–20 are applied to a binary-coded decimal-(BCD)-to-decimal decoder and readout DR.

More particularly, the output terminal of a NOR-gate 366 is connected to the first input terminal of NOR-gates NO–1, NO–5, NO–9, NO–13, and NO–17. Similarly, the output terminal $b$ of NOR-gate 362 is connected to the first terminal of NOR-gates NO–2, NO–6, NO–10, NO–14, and NO–18. In a like manner, output terminal $c$ of NOR-gate 368 is connected to the first input terminal of NOR-gates NO–3, NO–7, NO–11, NO–15, and NO–19. Connected to the output terminal $d$ of NOR-gate 364 is the second input terminal of NOR-gate NO–4 and the first input terminal of NOR-gates NO–8, NO–12, NO–16, and NO–20.

The output terminal $e$ of NOR-gate 388 in word separator WS is connected through an inverter IV–1 to the common-connected second input terminals of NOR-gates NO–1 through NO–3 and the first input terminal of gate NO–4. Similarly, the output $f$ of NOR-gate 378 is connected through an inverter IV–2 to the common-connected second input terminals of NOR-gates NO–5 through NO–8 and the output terminal $g$ of NOR-gate 386 is connected through an inverter IV–3 to the common-connected second input terminals of NOR-gates NO–9 through NO–12. Finally, the output terminal $h$ of NOR-gate 380 is connected through an inverter IV–4 to the common-connected second input terminals of NOR-gates NO–13 through NO–16, and output terminal $i$ of NOR-gate 390 is connected to the second input terminal of NOR-gates NO–17 through NO–20. Each of the reset terminals R of bistable multivibrators K–1 through K–20 and L–1 through L–20 are connected to the output of NOR-gate 214 in round counter RC.

RECEIVER OPERATION

Prior to the receipt of a signal by receiver FM, the signal developed at the squelch output thereof remains at approximately 9 volts. This signal, when applied to the gate of field-effect transistor 152 of inverter amplifier IA, causes a binary "1" signal to appear at the drain terminal of this transistor. This binary "1" signal is applied to the base of transistor 160 thereby causing this transistor to become forward-biased, which in turn causes a binary "0" signal to appear at the collector thereof. This binary "0" signal is inverted through inverter 168 to provide a binary "1" signal which is applied to the reset terminals of bistable multivibrators FF8 through FF14 thereby resetting these multivibrators. Further, with no signal present, i.e., a binary "0" signal, at the collector of transistor 160, unijunction transistor 172 will be reverse-biased, thereby preventing a signal from being applied to monostable multivibrator MM. Prior to the time a pulse signal is applied to monostable multivibrator MM, or "one-shot"-switching circuit, transistor 196 is forward-biased thereby reverse-biasing transistor 184. With transistor 184 reverse-biased, a binary "1" signal appears at the collector thereof, which signal is applied to the gate terminal of field-effect transistor 256 in the reference average and hold circuit RH. With a binary "1" signal applied to the gate of field-effect transistor 256, this transistor will remain nonconductive thereby causing a positive signal to be applied to the gate of field-effect transistor 228, and a negative polarity signal to be applied to the gate of field-effect transistor 230. With field-effect transistors 328 and 230 in nonconductive conditions, any signal developed by receiver FM will not be applied to the reference average and hold circuit RH. Prior to the time a signal is applied to reference average and hold circuit RH, the output signal developed by subtractor ST takes the form of approximately zero potential, which signal when applied through differential voltage comparators 300, 302, 332, and 334, cause a binary "0" signal to be applied to the input of inverter 350 and binary "0" signals to be applied to both inputs of NOR-gate 348. With binary signals present at both input terminals of NOR-gate 348, the output signal thereof remains at a binary "1" signal thereby preventing bistable multivibrators FF10 through FF14 from being triggered to the first count. It should be noted that multivibrators FF10 through FF14 are sequenced to the next count each time the signal applied to trigger terminal T of multivibrator FF10 changes from a binary "1" to a binary "0" signal; therefore, as is readily apparent, multivibrators FF10 through FF14 remain in the reset position so long as the output signal developed by NOR-gate 348 remains at a binary "1" level.

When bistable multivibrators FF10 through FF14 are at the reset condition, the signals developed at terminals 1 and 0 of each multivibrator take the form of binary "0" and binary "1" signals, respectively. With bistable multivibrators FF10 through FF14 in this reset condition, and with a binary "1"

signal developed at the output of inverter 350 in information and clock pulse generator CP, a binary "1" signal will be applied to at least one input terminal of NOR-gates 362, 364, 366, 368, 378, 380, 386, 388, and 390. Since a binary "1" signal is applied to at least one input terminal of each of the NOR gates, the output signals will take the form of binary "0" signals which when applied through inverters IV–1 through IV–4 to NOR-gates NO–1 through NO–20 cause the output signals of these NOR gates to take the form of binary "0" signals. These binary "0" signals are inverted through inverters J–1 through J–20 to provide binary "1" signals at the trigger terminal T of bistable multivibrators K–1 through K–20. Bistable multivibrators K–1 through K–20 and L–1 through L–20 are connected together to provide a counting function each time the signal applied to the trigger terminal T of multivibrator K–1 through K–20 changes from a binary "1" to a binary "0" signal; therefore, with a binary "1" signal applied to the trigger terminals all multivibrators remain in the reset condition.

Upon receipt of the carrier or intermediate level frequency by receiver FM, the output of the squelch circuit decreases from approximately 9 volts to approximately 0 volts, or ground potential. When this signal, equal to approximately ground potential, or a binary "0" signal is applied to the gate of field-effect transistor 152, the signal developed at the drain terminal thereof changes from a binary "1" to a binary "0" signal. This binary "0" signal causes transistor 160 to become reverse-biased thereby causing the signal developed at the collector of this transistor to change from a binary "0" signal to a binary "1" signal. This changing signal, when applied to the emitter of unijunction transistor 172, causes this transistor to momentarily become forward-biased thereby causing a negative pulse to be applied to the cathode of diode 200. When the cathode of diode 200 receives a negative pulse, transistor 196 becomes reverse-biased momentarily thereby causing transistor 184 to become forward-biased momentarily. The momentary forward-biasing of transistor 184 causes the signal applied to the gate of field-effect transistor 256 to take the form of a signal pulse changing from a positive value to approximately ground potential, and then back to a positive potential. This pulse in turn causes field-effect transistor 256 to momentarily become conductive thereby opening the gate comprised of field-effect transistors 228 and 230, and causing capacitor 238 to charge to a voltage equal to the carrier or reference signal value. This sampling time is equal to the "on" time of monostable multivibrator MM. At this time, i.e., upon receipt of the carrier or reference frequency, the output signal developed by subtractor ST remains at approximately zero voltage, or ground potential, thereby causing the signal received by information and clock pulse generator CP to remain at the same level. Since the signal received by information and clock-pulse generator CP remains at the same level, the signals applied to the remainder of the circuit also remain unchanged.

Upon receipt of the first binary-coded signal, i.e., a low frequency signal with the message and decade switches set as shown in FIG. 2, a negative polarity signal is applied to inverter buffer amplifier BA thereby causing a positive polarity signal to be applied to the signal average and hold circuit CH charging capacitor 270 proportional to the signal applied by buffer amplifier BA. The signal stored by capacitor 270 forward-biases field-effect transistor 266 thereby forward-biasing emitter-follower transistor 280 and causing a positive potential signal to be applied to terminal *r*. When the received signal returns to the reference or carrier frequency level, capacitor 270 is discharged to "clear" the intelligence prior to the receipt of the next signal to be processed. With a low frequency signal applied, the positive potential signal at terminal *r* is applied to subtractor ST wherein the output signal thereof takes the form of a negative signal. When this negative signal is applied to comparators 300 and 302, the output signals thereof take the form of a binary "0" and binary "1" signal, respectively. When a binary " 0" is applied to comparator 332 and a binary "1" signal is applied to comparator 334, the output signals thereof take the form of a binary "1" signal, respectively. The binary "0" signal developed at the output of comparator 332 is inverted through inverter 350 thereby causing a binary "1" signal to be applied to NOR-gates 362, 364, 366, and 368. The binary "1" signal developed at the output of comparator 334, when applied to NOR-gate 348, causes the signal applied to trigger terminal T of bistable multivibrator FF10 to change from a binary "1" to a binary "0" signal level. This changing signal in turn causes multivibrators FF10 through FF14 to be actuated to the first count. In this count, the signals developed at terminal 1 and terminal 0 of multivibrators FF10 through FF14 take the form of a binary "1" and binary "0" respectively. At this time, a binary "1" signal will be applied to at least one terminal of NOR-gates 362, 364, 366, 368, 378, 380, 386, and 390; however, binary "0" signals will be applied to all of the input terminals of NOR-gate 388. With these input signals, the output signal of each of the NOR gates takes the form of a binary "0" signal with the exception of the output signal of NOR-gate 388 which takes the form of a binary "1" signal. The binary "1" signal developed at the output of NOR-gate 388 is inverted through inverter IV–1 to thereby cause a binary "0" signal to be applied at one of the input terminals of NOR-gate NO–1 through NO–4, and the binary "0" signals developed at the outputs of NOR-gates 378, 380, 386, and 390 are inverted through inverters IV–2 through IV–5 to thereby cause binary "1 signals to be applied to one of the inputs terminals of NOR-gates NO–5 through NO–20. The binary "0" signals developed at the outputs of NOR-gates 362, 364, 366, and 368, are applied directly to the other input terminals of NOR-gates NO–1 through NO–20. Since a binary "1" signal is applied to at least one of the input terminals of each NOR-gate NO–1 through NO–20, the signal applied to trigger terminal T of multivibrators K–1 through K–20 remain at a binary "1" level thereby causing the output signal developed at terminals 1 of bistable multivibrators L–1 through L–20 to remain at a binary "0" level.

Upon receipt of the second pulse, i.e., a high frequency pulse with the transmitter message selector set as shown in FIG. 2, the output signal of subtractor ST takes the form of a positive polarity signal. This positive signal causes a binary "1" signal to be developed at the output of comparator 332, and a binary "0" signal to be developed at the output of comparator 334. The binary "1" signal, when applied to one of the input terminals of NOR-gates 348, causes the signal developed at the output thereof to take the form of a binary "0" signal which in turn causes bistable multivibrators FF10 through FF14 to proceed to the next count. This binary "1" signal is also inverted through inverter 350 to thereby cause a binary "0" signal to be applied to one of the input terminals of NOR-gates 362, 364, 366, and 368. After the second pulse, the signals developed at the output of bistable multivibrators FF –FF14 take the form as indicated in Table II. With this particular signal pattern, NOR-gates 362 and 388 are actuated to thereby provide binary "1" output signals. The output signals of the other NOR gates take the form of binary "0" signals. With this pattern of signals applied to NOR-gates NO–1 through NO–20 the signals applied to trigger terminals T of bistable multivibrators K–1 through K–20 remain unchanged with the exception of multivibrator K–2. The signal applied to trigger terminal T of multivibrator K–2 changes from a binary "1" level to a binary "0" level thereby causing the output signal developed at terminal 1 of NOR-gate L–2 to take the form of a binary "1" signal. When this binary "1" signal is applied to BCD to decimal readout DR–1, the decimal readout indicates the decimal number 2.

With reference to Receiver Truth Table II, it is readily apparent that as the receiver FM receives a binary-coded decimal word, least significant figure first, transmitted by the transmitter, a match will occur at selected ones of NOR-gates 362, 364, 366, 368, 378, 380, 386, 388, and 390 and NO–1 through NO–20, such that the binary weight of the signal pattern will be representative of the message transmitted. These binary signals are applied through the memory circuitry including bistable multivibrators K–1 through K–20 and L–1 through L–20 to the BCD to decimal readouts DR–1 through DR–5. The memory circuitry including bistable multivibrators K–1 through K–20 and L–1 through L–20 automatically correct an error in the transmission of a signal bit since the transmitted message is repeated three times, and these multivibrators provide majority decision logic.

TABLE II.—RECEIVER TRUTH TABLE

| Time or pulse | FF10 1 0 | FF11 1 0 | FF12 1 0 | FF13 1 0 | FF14 1 0 | Gates activated | Output to majority decision logic | Decimal number received |
|---|---|---|---|---|---|---|---|---|
| Before squelch. | 0 2 | 0 2 | 0 2 | 0 2 | 0 2 | None | None | |
| Squelch | 0 2 | 0 2 | 0 2 | 0 2 | 0 2 | None | do | |
| Squelch plus one shot. | 0 2 | 0 2 | 0 2 | 0 2 | 0 2 | None | do | |
| 1 | 2 0 | 2 0 | 2 0 | 2 0 | 2 0 | 388 | do | |
| 2 | 0 2 | 2 0 | 2 0 | 2 0 | 2 0 | 362 & 388 | Bit value 2 | |
| 3 | 2 0 | 0 2 | 2 0 | 2 0 | 2 0 | 388 | None | |
| 4 | 0 2 | 0 2 | 2 0 | 2 0 | 2 0 | 388 | do | (2) |
| 5 | 2 0 | 2 0 | 0 2 | 2 0 | 2 0 | 378 | do | |
| 6 | 0 2 | 2 0 | 0 2 | 2 0 | 2 0 | 378 | do | |
| 7 | 2 0 | 0 2 | 0 2 | 2 0 | 2 0 | 378 | do | |
| 8 | 0 2 | 0 2 | 0 2 | 2 0 | 2 0 | 378 | do | (0) |
| 9 | 2 0 | 2 0 | 2 0 | 0 2 | 2 0 | 386 | do | |
| 10 | 0 2 | 2 0 | 2 0 | 0 2 | 2 0 | 386 | do | |
| 11 | 2 0 | 0 2 | 2 0 | 0 2 | 2 0 | 386 | do | |
| 12 | 0 2 | 0 2 | 2 0 | 0 2 | 2 0 | 364 & 386 | Bit value 8 | (8) |
| 13 | 2 0 | 2 0 | 0 2 | 0 2 | 2 0 | 366 & 380 | Bit vlaue 1 | |
| 14 | 0 2 | 2 0 | 0 2 | 0 2 | 2 0 | 362 & 380 | Bit value 2 | |
| 15 | 2 0 | 0 2 | 0 2 | 0 2 | 2 0 | 380 | None | |
| 16 | 0 2 | 0 2 | 0 2 | 0 2 | 2 0 | 380 | do | (3) |
| 17 | 2 0 | 2 0 | 2 0 | 2 0 | 0 2 | 366 & 390 | Bit value 1 | |
| 18 | 0 2 | 2 0 | 2 0 | 2 0 | 0 2 | 390 | None | |
| 19 | 2 0 | 0 2 | 2 0 | 2 0 | 0 2 | 364 & 390 | Bit value 4 | |
| 20 | 0 2 | 0 2 | 2 0 | 2 0 | 0 2 | 390 | None | (5) |
| 21 | 2 0 | 2 0 | 0 2 | 2 0 | 0 2 | | | |
| | 0 2 | 0 2 | 0 2 | 0 2 | 0 2 | | | Reset |

In accordance with the preferred embodiment of the invention types of various components illustrated in FIG. 1 through 5 are formed in Table III.

TABLE III.—TYPES OF COMPONENTS

| Component | Value or type |
|---|---|
| 18, 20, 84, 110, 116, 128, 136, 142, 160, 184, 196, 244. 280. | 2N4124. |
| D1, D2, D3, D9–D28, 62, 64, 66, 68, 70, 82, 90, 91, 106, 111, 120, 124, 164, 190, 200, 240, 242, 258, 272, 274. | 1N456A. |
| 152, 228, 236, 256, 268 | 2N4360. |
| 230, 234, 266 | MPF102. |
| 172 | 2N1671. |
| G1–54, G2–56, G3–58, G4–60, G29–I1, G30–50, G31–I2, G32–48, G33–I3, G34–52. | One-half Motorola NOR Gate and Amplifier MC788P. |
| I8, 30, 38, 40, 42, 44, 46, 54, 56, 58, 60, 72, 74. | One-sixth Motorola amplifier MC789P. |
| FF1–FF7 | One-half Motorola flip-flop MC790P. |
| G1–G8 | One-third Motorola NOR gate MC725P. |
| G9–G28 | One-half Motorola NOR gate MC725P. |
| 220, 294 | Philbrick amplifier PP55AU. |
| 300, 302, 332, 334 | Lansdale Transistor and Electronics, Inc., comparator LTE 710. |

Having thus described our invention, we claim:

1. A binary-coded signal communication system including a plurality of spaced separate transmitters each for transmitting binary-coded frequency signals and a receiver for receiving said binary signals, wherein:

each of said transmitters includes circuit means for generating a reference frequency signal and circuit means for generating at least one address word, a message word, wherein each word is comprised of a series of binary-coded frequency pulses selected from a first frequency and a second frequency;

frequency shift control means for selectively shifting the frequency of said circuit means for generating said reference frequency signal from said reference frequency to either of said first frequency or said second frequency;

said frequency shift control means including a plurality of frequency-selecting actuatable switching means each for, upon actuation, selecting one of said frequencies;

means for sequentially actuating said plurality of switching means so that the overall frequency signal includes a train of time-spaced frequency pulses with the frequency of each said frequency pulse being a selected one of two different frequencies in accordance with which one of said switching means is actuated and that during the time space between adjacent frequency pulses the frequency of said overall frequency signal is that of said reference frequency;

said receiver including means for separating said reference frequency from said series of binary-coded first and second frequencies, and binary-coded decimal-to-decimal decoder means for decoding said series of binary-coded first and second frequencies and providing decimal indications thereof;

said receiver including first circuit means for receiving said reference frequency signal and said series of binary-coded frequency pulses;

second circuit means for separating said reference frequency signal from said series of binary-coded frequency pulses; and binary-coded to decimal decoder means for decoding said series of binary-coded frequency pulses and providing decimal indications thereof including signal-counting means for receiving *n* sets of such series of binary-coded frequency pulses and providing *n* sets of patterns of first binary-coded decimal output signals; majority decision logic circuit means for sampling said *n* sets of patterns of binary-coded signals and providing a second pattern of binary-coded decimal output signals representative of at least a majority of said *n* sets of patterns of said first binary-coded decimal output signals; and binary-coded decimal-to-decimal decoder means for decoding said second pattern of binary-coded decimal output signals and providing decimal indications thereof so that said decimal indications are representative of the majority of said *n* sets of said series of binary-coded frequency pulses.

2. A binary coded signal communication system as set forth in claim 1 wherein said majority decision logic means include first bistable multivibrator means having an input circuit coupled to said signal-counting means and an output circuit;

second bistable multivibrator means having an input circuit coupled to said output circuit of said first bistable multivibrator means an output circuit coupled to said binary-coded decimal-to-decimal decoder means.

3. A binary-coded signal communication system as set forth in claim 1 wherein said receiver includes a reference average and hold circuit means for receiving said reference frequency, and a signal average and hold circuit for receiving said first and second frequencies and providing an output signal pattern to the majority decision logic means selected from first and second level signals dependent upon the frequency of said received signal.

4. Apparatus as set forth in claim 2 wherein said controlled oscillator means includes a third frequency determining impedance; and, said N-binary signal logic means, upon receipt of another preselected binary output signal pattern from said binary-counting means, connecting said third frequency determining impedance in series with said variable capacitance means across said direct current source.

5. Apparatus for transmitting at least N-words wherein each word is comprised of a series of four consecutive frequency pulses selected from two different frequency levels and coded as a binary-coded decimal number with the total binary content of each word having a decimal weight in the range of from 0 to 15 and which transmission is repeated a plurality of times consecutively comprising:

controllable oscillator means for providing a train of frequency pulses of a normal given frequency of $f_r$ and controllable to first and second frequency level conditions of frequencies $f$ and $f_2$ respectively representative of binary "1" and binary "0" signals;

first binary counting means for counting trigger pulses and providing an output pattern of binary signals which pattern changes in dependence upon the number of trigger pulses counted;

means for sequentially applying N-trains of four consecutive trigger pulses each to said binary-counting means; and N-binary signal logic means respectively associated with a different one of said N-trains of trigger pulses for consecutively receiving the binary signal output pattern resulting from the sequentially applied four trigger pulses of said associated train of trigger pulses and for each trigger pulse actuating said controllable oscillator means to either said first or said second frequency level; and, second binary-counting means to reinitiate the first binary-counting means to at least one more complete cycle and terminate the actuation of the oscillator means at the end of a predetermined number of cycles.

6. Apparatus as set forth in claim 5, wherein said controlled oscillator means includes, a crystal-controlled oscillator means for providing an output frequency;

variable capacitance means adapted to be coupled to said crystal-controlled oscillator means for varying the oscillator output frequency, said capacitance means exhibiting the characteristic of having its capacitance vary in response to variations in the electrical potential applied thereto;

a direct current voltage source;

a first frequency-determining impedance connected in series with said capacitance means across said direct current voltage source;

a second frequency-determining impedance; and said N-binary signal logic means, upon receipt of a preselected binary signal output pattern from said binary-counting means, connecting said second frequency-determining impedance in series with said capacitance means across said source.

7. Apparatus as set forth in claim 6, including actuatable switch means connected in series with said second frequency-determining impedance and said variable capacitance means across said direct current voltage source; and said N-binary signal voltage logic means each including at least four NOR gate means adapted to be selectively connected to said actuatable switch means; said NOR gate means, for upon receipt of a said predetermined binary signal pattern from said first binary-counting means, actuating said actuatable switch means.

8. A binary-coded signal receiver for receiving a train of frequency pulses comprised of a reference frequency signal and a series of binary-coded first and second frequency signal and for providing decimal indications of said received binary-coded frequency signals including:

first circuit means for receiving said reference frequency series of binary-coded first and second frequency signals;

second circuit means for separating said reference frequency signal from said series of first and second frequency signals; and, binary-coded to decimal decoder means for decoding said series of binary-coded first and second frequency signals and providing decimal indications thereof including;

signal-counting means for receiving N-sets of said series of binary-coded first and second frequency signals and providing N-sets of patterns of first binary-coded decimal output signals;

majority decision logic circuit means for sampling said N-sets of patterns of binary-coded decimal output signals and providing a second pattern of binary-coded decimal output signals representative of at least a majority of said N-sets of patterns of said first binary-coded decimal output signals; and, binary-coded decimal-to-decimal decoder means for decoding said second pattern of binary-coded decimal output signals and providing decimal indications thereof so that said decimal indications are representative of the majority of said N-sets of said series of binary-coded first and second frequency signals.

9. A binary coded signal receiver as defined in claim 8, wherein said majority decision logic means include first bistable multivibrator means having an input circuit coupled to said signal-counting means and an output circuit and, second bistable multivibrator means having an input circuit coupled to said output circuit of said first bistable multivibrator means and an output circuit coupled to said binary-coded decimal-to-decimal decoder means.

* * * * *